United States Patent
Hwang et al.

(10) Patent No.: US 9,854,333 B2
(45) Date of Patent: Dec. 26, 2017

(54) METHOD AND APPARATUS FOR TRANSMITTING AND RECEIVING BROADCAST SIGNAL FOR PROVIDING HEVC BASED IP BROADCAST SERVICE

(71) Applicant: LG ELECTRONICS INC., Seoul (KR)

(72) Inventors: Soojin Hwang, Seoul (KR); Jongyeul Suh, Seoul (KR); Joonhee Yoon, Seoul (KR); Hyunmook Oh, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/023,278

(22) PCT Filed: Oct. 29, 2014

(86) PCT No.: PCT/KR2014/010237
§ 371 (c)(1),
(2) Date: Mar. 18, 2016

(87) PCT Pub. No.: WO2015/065037
PCT Pub. Date: May 7, 2015

(65) Prior Publication Data
US 2016/0360295 A1    Dec. 8, 2016

Related U.S. Application Data
(60) Provisional application No. 61/897,205, filed on Oct. 29, 2013, provisional application No. 61/898,452, filed on Oct. 31, 2013.

(51) Int. Cl.
*H04N 21/845* (2011.01)
*H04N 21/236* (2011.01)
(Continued)

(52) U.S. Cl.
CPC ....... *H04N 21/8451* (2013.01); *H04N 21/236* (2013.01); *H04N 21/2362* (2013.01);
(Continued)

(58) Field of Classification Search
CPC combination set(s) only.
See application file for complete search history.

(56) References Cited

U.S. PATENT DOCUMENTS

| | | |
|---|---|---|
| 2012/0069146 A1 | 3/2012 | Lee et al. |
| 2013/0113880 A1 | 5/2013 | Zhao et al. |

(Continued)

FOREIGN PATENT DOCUMENTS

| | | |
|---|---|---|
| EP | 2 637 412 A2 | 9/2013 |
| JP | 2003-18562 A | 1/2003 |

(Continued)

OTHER PUBLICATIONS

"Special-edition I Would Like to Know 50 Wants to Know Imaging Technology Appendix 2 Television Broadcasting," Interface, vol. 39, No. 4, Apr. 1, 2013, pp. 5, 7, 65-70, 170 (Total 11 pages), ISSN: 0387-9569.

(Continued)

*Primary Examiner* — Mulugeta Mengesha
(74) *Attorney, Agent, or Firm* — Birch, Stewart, Kolasch & Birch, LLP

(57) ABSTRACT

The present invention relates to a method and apparatus for transmitting and receiving a broadcast signal for providing HEVC based IP broadcast service. The method for transmitting a broadcast signal according to an embodiment of the present invention comprises the steps of: generating a video stream by encoding video data; generating signaling information which includes any one among information indicating the generated video stream is a HEVC video stream, information indicating the characteristic of the gen- (Continued)

erated video stream, and information indicating a broadcast service on the basis of the generated video stream is the HEVC based broadcasting service; multiplexing the generated video stream and the signaling information; and transmitting the multiplexed broadcast stream.

12 Claims, 22 Drawing Sheets

(51) Int. Cl.
  *H04N 21/2362* (2011.01)
  *H04N 21/61* (2011.01)
  *H04N 21/81* (2011.01)
  *H04N 21/633* (2011.01)
  *H04N 21/643* (2011.01)

(52) U.S. Cl.
  CPC ....... *H04N 21/6112* (2013.01); *H04N 21/633* (2013.01); *H04N 21/64322* (2013.01); *H04N 21/816* (2013.01)

(56) References Cited

U.S. PATENT DOCUMENTS

| | | | |
|---|---|---|---|
| 2013/0272371 | A1 | 10/2013 | Haque et al. |
| 2013/0314495 | A1* | 11/2013 | Chen ............... H04N 13/0048 348/43 |
| 2015/0063467 | A1 | 3/2015 | Hendry et al. |
| 2015/0172690 | A1* | 6/2015 | Tsukagoshi ............ H04N 19/70 375/240.26 |
| 2015/0326895 | A1 | 11/2015 | Suh et al. |

FOREIGN PATENT DOCUMENTS

| | | |
|---|---|---|
| JP | 2004-282415 A | 10/2004 |
| JP | 2009-88737 A | 4/2009 |
| JP | 2011-244411 A | 12/2011 |
| WO | WO 2012/105265 A1 | 8/2012 |
| WO | WO 2013/137697 A1 | 8/2012 |
| WO | WO 2013/015596 A2 | 1/2013 |

OTHER PUBLICATIONS

He et al., "Non-SCE4/AHG14: Combined Bit- . . . ," Joint Collaborative Team on Video Coding (JCT-VC) of ITU-T SG 16 WP3 and ISO/IEC JTC 1/SC 29/WG 11, 15th Meeting, Geneva, CH, Document: JCTVC-O0161, Oct. 23-Nov. 1, 2013, pp. 1-7 (Total 16 pages), with Slide Presentation.

ISO/IEC, "Information Technology—Generic Coding of Moving Pictures and Associated Audio Information: Systems—Part 1, Amendment 3: Transport of High Efficiency Video Coding (HEVC) . . . ," Final Draft, Reference No. ISO/IEC 13818-1:2013/FDAM 3:2013(E), 2013, pp. 1-5 (Total 7 pages).

Segall et al., "Tone Mapping SEI Message," Joint Video Team (JVT) of ISO/IEC MPEG & ITU-T VCEG (ISO/IEC JTC1/SC29/WG11 and ITU-T SG16 Q.6), Document: JVT-S087, Filename: Document1 , 19th Meeting, Geneva, Switzerland, Apr. 1-10, 2006, pp. 1-12.

Segall et al., "Tone Mapping SEI Message," Joint Video Team (JVT) of ISO/IEC MPEG & ITU-T VCEG (ISO/IEC JTC1/SC29/WG11 and ITU-T SG16 Q.6), Document: JVT-S087, Filename: JVT-S087r1.doc, 19th Meeting, Geneva, Switzerland, Apr. 1-10, 2006, pp. 1-12.

* cited by examiner

FIG. 1

| Syntax | No. of bits | Mnemonic |
|---|---|---|
| TS_program_map_section() { | | |
|     table_id | 8 | uimsbf |
|     section_syntax_indicator | 1 | bslbf |
|     '0' | 1 | bslbf |
|     reserved | 2 | bslbf |
|     section_length | 12 | uimsbf |
|     program_number | 16 | uimsbf |
|     reserved | 2 | bslbf |
|     version_number | 5 | uimsbf |
|     current_next_indicator | 1 | bslbf |
|     section_number | 8 | uimsbf |
|     last_section_number | 8 | uimsbf |
|     reseved | 3 | bslbf |
|     RCR_PID | 13 | uimsbf |
|     reseved | 4 | bslbf |
|     program_info_length | 12 | uimsbf |
|     for (i=0; i<N; i++) { | | |
|         descriptor() | | |
|     } | | |
|     for (i=0; i<N; i++) { | | |
|         stream_type | 8 | uimsbf |
|         reserved | 3 | bslbf |
|         elementary_PID | 13 | uimsbf |
|         reserved | 4 | bslbf |
|         ES_info_length | 12 | uimsbf |
|         for (i=0; i<N; i++) { | | |
|             descriptor() | | |
|         } | | |
|     } | | |
|     CRC_32 | 32 | rpchof |
| } | | |

FIG. 2

| Syntax | No. of bits | Identifier |
|---|---|---|
| event_information_section () { | | |
|     table_id | 8 | uimsbf |
|     section_syntax_indicator | 1 | bslbf |
|     reserved_future_use | 1 | bslbf |
|     reserved | 2 | bslbf |
|     section_length | 12 | uimsbf |
|     service_id | 16 | uimsbf |
|     reserved | 2 | bslbf |
|     version_number | 5 | uimsbf |
|     current_next_indicator | 1 | bslbf |
|     section_number | 8 | uimsbf |
|     last_section_number | 8 | uimsbf |
|     transport_stream_id | 16 | uimsbf |
|     original_network_id | 16 | uimsbf |
|     segment_last_section_number | 8 | uimsbf |
|     last_table_id | 8 | uimsbf |
|     for (i=0; i<N; i++) { | | |
|         event_id | 16 | uimsbf |
|         start_time | 40 | bslbf |
|         duration | 24 | uimsbf |
|         running_status | 3 | uimsbf |
|         free_CA_mode | 1 | bslbf |
|         descriptors_loop_length | 12 | uimsbf |
|         for (i=0; i<N; i++) { | | |
|             descriptor () | | |
|         } | | |
|     } | | |
|     CRC_32 | 32 | rpchof |
| } | | |

FIG. 3

| Syntax | No. of bits | Format |
|---|---|---|
| component_descriptor () { | | |
|     descriptor_tag | 8 | uimsbf |
|     descriptor_length | 8 | uimsbf |
|     reserved_future_use | 4 | bslbf |
|     stream_content | 4 | uimsbf |
|     component_type | 8 | uimsbf |
|     component_tag | 8 | uimsbf |
|     ISO_639_language_code | 24 | bslbf |
|     for (i=0; i<N; i++) { | | |
|         text_char | 8 | uimsbf |
|     } | | |
| } | | |

FIG. 4

| stream content | No. of bits | No. of bits |
|---|---|---|
| 0x09 | 0x01 | HEVC SD video, 4:3, 25Hz, 8-bit |
| | 0x02 | HEVC SD video, 16:9, 25Hz, 8-bit |
| | 0x03 | HEVC SD video, beyond 16:9, 25Hz, 8-bit |
| | 0x04 | HEVC SD video, 4:3, 30Hz, 8-bit |
| | 0x05 | HEVC SD video, 16:9, 30Hz, 8-bit |
| | 0x06 | HEVC SD video, beyond 16:9, 30Hz, 8-bit |
| | 0x07 | HEVC HD video, 4:3, 25Hz, 8-bit |
| | 0x07 | HEVC HD video, 16:9, 25Hz, 8-bit |
| | 0x08 | HEVC HD video, beyond 16:9, 25Hz, 8-bit |
| | 0x09 | HEVC HD video, 4:3, 30Hz, 8-bit |
| | 0x0A | HEVC HD video, 16:9, 30Hz, 8-bit |
| | 0x0B | HEVC HD video, beyond 16:9, 30Hz, 8-bit |
| | 0x0C - 0x0F | reserved |
| | 0x11 | HEVC 4K UHD video, 16:9, 25Hz, 8-bit |
| | 0x12 | HEVC 4K UHD video, wide screen (beyond 16:9), 25Hz, 8-bit |
| | 0x13 | HEVC 4K UHD video, 16:9, 30Hz, 8-bit |
| | 0x14 | HEVC 4K UHD video, wide screen (beyond 16:9), 30Hz, 8-bit |
| | 0x15 | HEVC 4K UHD video, 16:9, 50Hz, 8-bit |
| | 0x16 | HEVC 4K UHD video, wide screen (beyond 16:9), 50Hz, 8-bit |
| | 0x17 | HEVC 4K UHD video, 16:9, 60Hz, 8-bit |
| | 0x18 | HEVC 4K UHD video, wide screen (beyond 16:9), 60Hz, 8-bit |
| | 0x19 | HEVC 4K UHD video, 16:9, 25Hz, 10-bit |
| | 0x1A | HEVC 4K UHD video, wide screen (beyond 16:9), 25Hz, 10-bit |
| | 0x1B | HEVC 4K UHD video, 16:9, 30Hz, 10-bit |
| | 0x1C | HEVC 4K UHD video, wide screen (beyond 16:9), 30Hz, 10-bit |
| | 0x1D | HEVC 4K UHD video, 16:9, 50Hz, 10-bit |
| | 0x1E | HEVC 4K UHD video, wide screen (beyond 16:9), 50Hz, 10-bit |
| | 0x1F | HEVC 4K UHD video, 16:9, 60Hz, 10-bit |
| | 0x20 | HEVC 4K UHD video, wide screen (beyond 16:9), 60Hz, 10-bit |

FIG. 5

| Syntax | No. of bits | Format |
|---|---|---|
| dynamic_range_transformation_info_descriptor ( ) { | | |
|     descriptor_tag | 8 | uimsbf |
|     descriptor_length | 8 | uimsbf |
|     reserved | 4 | |
|     dynamic_range_transformation_info_descriptor ( ) { | 4 | |
|         for(i=0; i<number_of_color_info; i++) { | | |
|             dynamic_range_transformation_metadata () | | |
|         } | | |
| } | | |

FIG. 6

| dynamic_range_transformation_metadata () { | No. of bits | Format |
|---|---|---|
|     luminance_max | | |
|     luminance_min | | |
|     luminance_upper_bound | | |
|     luminance_lower_bound | | |
|     number_luminance_upper_bound_diff | | |
|     for(i=0; number_luminance_upper_bound_diff; i++) { | | |
|         luminance_upper_bound_diff[i] | | |
|     } | | |
| } | | |

FIG. 7

| Syntax | No. of bits | Format |
|---|---|---|
| UHD_color_management_info_descriptor ( ) { | | |
|     descriptor_tag | 8 | uimsbf |
|     descriptor_length | 8 | uimsbf |
|     reserved | 4 | |
|     number_of_color_info | 4 | |
|         for(i=0; i<number_of_color_info; i++) { | | |
|             color_management_metadata () | | |
|         } | | |
| } | | |

FIG. 8

| color_management_metadata () { | No. of bits | Format |
|---|---|---|
|     gamut_mapping_flag | | |
|     reference_black_luminance_level | | |
|     reference_white_luminance_level | | |
|     color_gamut | | |
|     if(gamut_mapping_flag == 1){ | | |
|         color_primary_r_x | | |
|         color_primary_r_y | | |
|         color_primary_g_x | | |
|         color_primary_g_y | | |
|         color_primary_b_x | | |
|         color_primary_b_y | | |
|     } | | |
| } | | |

FIG. 9

| Syntax | Number of bits | Identifier |
|---|---|---|
| service_description_section () { | | |
|     table_id | 8 | uimsbf |
|     section_syntax_indicator | 1 | bslbf |
|     reserved_future_use | 1 | bslbf |
|     reserved | 2 | bslbf |
|     section_length | 12 | uimsbf |
|     transport_stream_id | 16 | uimsbf |
|     reserved | 2 | bslbf |
|     version_number | 5 | uimsbf |
|     current_next_indicator | 1 | bslbf |
|     section_number | 8 | uimsbf |
|     last_section_number | 8 | uimsbf |
|     original_network_id | 16 | uimsbf |
|     reserved_future_use | 8 | bslbf |
|     for (i=0; i<N; i++) { | | |
|       service_id | 16 | uimsbf |
|       reserved_future_use | 6 | bslbf |
|       EIT_schedule_flag | 1 | bslbf |
|       EIT_present_following_flag | 1 | bslbf |
|       running-status | 3 | uimsbf |
|       free_CA_mode | 1 | bslbf |
|       descriptors_loop_length | 12 | uimsbf |
|       for (j=0; j<N; j++) { | | |
|         descriptor () | | |
|       } | | |
|     } | | |
|     CRC_32 | 32 | rpchof |
| } | | |

FIG. 10

| Syntax | Number of bits | Format |
|---|---|---|
| service_descriptor () { | | |
|     descriptor_tag | 8 | uimsbf |
|     descriptor_length | 8 | uimsbf |
|     service_type | 8 | uimsbf |
|     service_provider_name_length | 8 | uimsbf |
|     for (i=0; i<N; i++) { | | |
|         char | 8 | uimsbf |
|     } | | |
|     service_name_length | 8 | uimsbf |
|     for (i=0; i<N; i++) { | | |
|         char | 8 | uimsbf |
|     } | | |
| } | | |

FIG. 11

| service_type | Description |
|---|---|
| 0x1F | H.265/HEVC SD digital television service |
| 0x20 | H.265/HEVC SD NVOD time-shifted service |
| 0x21 | H.265/HEVC SD NVOD reference service |
| 0x22 | H.265/HEVC HD digital television service |
| 0x23 | H.265/HEVC HD NVOD time-shifted service |
| 0x24 | H.265/HEVC HD NVOD reference service |
| 0x25 | H.265/HEVC UHD-1A digital television service |
| 0x26 | H.265/HEVC UHD-1A NVOD time-shifted service |
| 0x27 | H.265/HEVC UHD-1A NVOD reference service |
| 0x28 | H.265/HEVC UHD-1B digital television service |
| 0x29 | H.265/HEVC UHD-1B NVOD time-shifted service |
| 0x2A | H.265/HEVC UHD-1B NVOD reference service |

FIG. 12

| System Format | Video Format | Audio Format | Subtitle format | MIME Type |
|---|---|---|---|---|
| TS | AVC_SD_25<br>AVC_HD_25 | HEAAC<br>E-AC3(see not 1) | See not 2. | video/mpeg |
| MP4 | AVC_SD_25<br>AVC_HD_25 | HEAAC<br>E-AC3(see not 1) | Not defined in the present document | video/mp4 |
| | NOTE1 : Terminals shall support E-AC3 for content received by the broadband connection when it is supported for the broadcast connection. Otherwise It is not mandated | | | |
| | NOTE2 : Terminals shall support the same subtitle formats for content received by the broadband connection as are supported for the broadcast connection | | | |

FIG. 13

| System Format | Video Format | Audio Format | MIME Type |
|---|---|---|---|
| TS | AVC_HD_25<br>AVC_SD_25<br>AVC_SP_25<br>AVC_3D_25 | HEAAC<br>HEAAC2<br>HEAAC_MPS<br>MPEG1_L2<br>MPEG1_L2_MPS<br>AC3<br>E-AC3<br>DTS | video/mpeg or video/mp2t |
| TTS | AVC_HD_25<br>AVC_SD_25<br>AVC_SP_25<br>AVC_3D_25 | HEAAC<br>HEAAC2<br>HEAAC_MPS<br>MPEG1_L2<br>MPEG1_L2_MPS<br>AC3<br>E-AC3<br>DTS | video/vnd.dlna.mpeg.tts |
| MP4 | AVC_HD_25<br>AVC_SD_25<br>AVC_SP_25<br>AVC_3D_25 | HEAAC<br>HEAAC2<br>HEAAC_MPS<br>MPEG1_L2<br>MPEG1_L2_MPS<br>AC3<br>E-AC3<br>DTS | video/mp4 |
| TS | MPEG2_SD_25<br>MPEG2_SP_25 | MPEG1_L2<br>MPEG1_L2_MPS<br>AC3<br>E-AC3 | video/mpeg or video/mp2t |
| TTS | MPEG2_SD_25<br>MPEG2_SP_25 | MPEG1_L2<br>MPEG1_L2_MPS<br>AC3<br>E-AC3 | video/vnd.dlna.mpeg.tts |

FIG. 14

| System Format | Video Format | Audio Format | MIME Type |
|---|---|---|---|
| TS | AVC_HD_30<br>AVC_SD_30<br>AVC_SP_30<br>AVC_3D_30 | HEAAC<br>HEAAC2<br>HEAAC_MPS<br>AC3<br>E-AC3<br>DTS | video/mpeg or video/mp2t |
| TTS | AVC_HD_30<br>AVC_SD_30<br>AVC_SP_30<br>AVC_3D_30 | HEAAC<br>HEAAC2<br>HEAAC_MPS<br>AC3<br>E-AC3<br>DTS | video/vnd.dlna.mpeg.tts |
| MP4 | AVC_HD_30<br>AVC_SD_30<br>AVC_SP_30<br>AVC_3D_30 | HEAAC<br>HEAAC2<br>HEAAC_MPS<br>AC3<br>E-AC3<br>DTS | video/mp4 |

FIG. 15

```xml
<?xml version="1.0" encoding="UTF-8"?>
<ClassificationScheme uri="urn:oipf:cs:VisualCodingFormatCS:2008">
<!-- schema file is cs-VisualCodinfFormatCS.xml -->
<Term termId="HEVC_UHD_25">
<Name xml:lang="en">HEVC_UHD_25</Name>
<Definition xml:lang="en">H.265/HEVC video coding, Ultra High Definition, 25Hz systems</Definition>
</Term>
<Term termId="HEVC_UHD_30">
<Name xml:lang="en">HEVC_UHD_30</Name>
<Definition xml:lang="en">H.265/HEVC video coding, Ultra High Definition, 30Hz systems</Definition>
</Term>
<Term termId="HEVC_UHD_50">
<Name xml:lang="en">HEVC_UHD_25</Name>
<Definition xml:lang="en">H.265/HEVC video coding, Ultra High Definition, 25Hz systems</Definition>
</Term>
<Term termId="HEVC_UHD_60">
<Name xml:lang="en">HEVC_UHD_60</Name>
<Definition xml:lang="en">H.265/HEVC video coding, Ultra High Definition, 30Hz systems</Definition>
</Term>
<Term termId="HEVC_HD_25">
<Name xml:lang="en">HEVC_HD_25</Name>
<Definition xml:lang="en">H.265/HEVC video coding, High Definition, 25Hz systems</Definition>
</Term>
<Term termId="HEVC_HD_30">
<Name xml:lang="en">HEVC_HD_30</Name>
<Definition xml:lang="en">H.265/HEVC video coding, High Definition, 30Hz systems</Definition>
</Term>
<Term termId="HEVC_SD_30">
<Name xml:lang="en">HEVC_SD_30</Name>
<Definition xml:lang="en">H.264/AVC video coding, High Definition, 30Hz systems</Definition>
</Term>
<Term termId="AVC_SD_30">
<Name xml:lang="en">AVC_SD_30</Name>
<Definition xml:lang="en">H.264/AVC video coding, Standard Definition, 30Hz systems</Definition>
</Term>
</ClassificationScheme>
```

FIG. 16

```
<ClassificationScheme uri="urn:mpeg:mpeg7:cs:VisualCodingFormatCS:2001">
    domain="//MediaInformation/MediaProfile/MediaFormat/VisualCoding/format">
    <Term termID="1">
    <Term termId="HEVC_UHD_25">
        <Name xml:lang="en">MPEG-1 Video</Name>
        <Definition xml:lang="en">MPEG-1 Video Coding Format </Definition>
    </Term>
        <Name xml:lang="en">MPEG-2 Video</Name>
        <Definition xml:lang="en">MPEG-2 Video Coding Format </Definition>
        <Term termID="2.1">
            <Name xml:lang="en">MPEG-2 Video Simple Profile</Name>
            <Term termID="2.1.1">
                <Name xml:lang="en">MPEG-2 Video Simple Profile @ Main Level</Name>
            </Term>
        </Term>
        <Term termID="2.2">
            <Name xml:lang="en">MPEG-2 Video Main Profile</Name>
            <Term termID="2.2.1">
                <Name xml:lang="en">MPEG-2 Video Main Profile @ Low Level</Name>
            </Term>
            <Term termID="2.2.2">
                <Name xml:lang="en">MPEG-2 Video Main Profile @ Main Level</Name>
            </Term>
            <Term termID="2.2.3">
                <Name xml:lang="en">MPEG-2 Video Main Profile @ High 1440 Level</Name>
            </Term>
            <Term termID="2.2.4">
                <Name xml:lang="en">MPEG-2 Video Main Profile @ High Level</Name>
            </Term>
```

FIG. 17

| TimeID | | | | Description |
|---|---|---|---|---|
| Codec | Profile | Tier | Level | |
| 9. | 1. | 1. | 1. | HEVC video coding format main profile main tier @level 3.0 |
| | | | 2. | HEVC video coding format main profile main tier @level 3.1 |
| | | | ... | ... |
| | | | 18 | HEVC video coding format main profile main tier @level 6.2 |
| | 2. | 1. | 1. | HEVC video coding format main10 profile main tier @level 3.0 |
| | | | 2. | HEVC video coding format main10 profile main tier @level 3.1 |
| | | | ... | ... |
| | | | 18 | HEVC video coding format main10 profile main tier @level 6.2 |
| | 3. | 1. | 1. | HEVC video coding format still picture profile main tier @level 3.0 |
| | | | 2. | HEVC video coding format still picture profile main tier @level 3.1 |
| | | | ... | ... |
| | | | 18 | HEVC video coding format still picture profile main tier @level 6.2 |

FIG. 18

```
<profilelist>
 <ui_profile name="OITF_HD_UIPROF+DVB_S+TRICK_MODE">
 <ext>
  <parentalcontrol schemes="dvb-si">true</parentalcontrol>
 </ext>
 </ui_profile>
 <clientMetadata type="dvb-si">true</clientMetadata>
 <video_profile name="MP4_AVC_SD_25_HEAAC" type="video/mp4" transport="dash"/>
 <video_profile name="MP4_AVC_HD_25_HEAAC" type="video/mp4" transport="dash"/>
 <audio_profile name="MPEG1_L3" type="audio/mpeg"/>
 <audio_profile name="HEAAC" type="audio/mp4"/>
 <video_profile name="TS_AVC_SD_25_HEAAC" type="video/mpeg" />
 <video_profile name="TS_AVC_HD_25_HEAAC" type="video/mpeg" />
 <video_profile name="MP4_AVC_SD_25_HEAAC" type="video/mp4" />
 <video_profile name="MP4_AVC_HD_25_HEAAC" type="video/mp4" />
 <audio_profile name="MPEG1_L3" type="audio/mpeg"/>
 <audio_profile name="HEAAC" type="audio/mp4"/>
 <video_profile name="MP4_HEVC_SD_30_HEAAC" type="video/mp4" transport="dash"/>
 <video_profile name="MP4_HEVC_HD_30_HEAAC" type="video/mp4" transport="dash"/>
 <video_profile name="MP4_HEVC_HD_50_HEAAC" type="video/mp4" transport="dash"/>
 <video_profile name="MP4_HEVC_HD_60_HEAAC" type="video/mp4" transport="dash"/>
 <video_profile name="MP4_HEVC_UHD_25_HEAAC" type="video/mp4" transport="dash"/>
 <video_profile name="MP4_HEVC_UHD_30_HEAAC" type="video/mp4" transport="dash"/>
 <video_profile name="MP4_HEVC_UHD_50_HEAAC" type="video/mp4" transport="dash"/>
 <video_profile name="MP4_HEVC_UHD_60_HEAAC" type="video/mp4" transport="dash"/>
 <video_profile name="TS_HEVC_SD_30_HEAAC" type="video/mpeg" />
 <video_profile name="TS_HEVC_HD_30_HEAAC" type="video/mpeg" />
 <video_profile name="TS_HEVC_HD_50_HEAAC" type="video/mpeg" />
 <video_profile name="TS_HEVC_HD_60_HEAAC" type="video/mpeg" />
 <video_profile name="TS_HEVC_UHD_25_HEAAC" type="video/mpeg" />
 <video_profile name="TS_HEVC_UHD_30_HEAAC" type="video/mpeg" />
 <video_profile name="TS_HEVC_UHD_50_HEAAC" type="video/mpeg" />
 <video_profile name="TS_HEVC_UHD_60_HEAAC" type="video/mpeg" />
</profilelist>
```

FIG. 20

| VideoAttributesType | A complex type defining a set of elements that describe video characteristics |
|---|---|
| Coding | The coding format of the video. This term should be taken from the MPEG-7 "VisualCodingFormatCS" classification schme listed in clause B.2.34 of ISO/IEC 15938-5 [2] |
| Scan | The scan type of the video |
| HorizonalSize | The horizontal size in pixels of the video |
| VerticalSize | The vertical size in pixels of the video |
| AspectRatio | The aspect ratio of the video. There may be two aspecttatios associated with a programme: the orginal aspect ratio that the progrmme is available in and the aspect ratio of a particular instance of the programme |
| Color | The colour format of the video (e.g. black and white) |
| FrameRate | An element expressing the frame rate of the video |
| BitRate | An element to define the bit rate of the video stream |
| PictureFromat | An element to define the format of the video image from a predefined list (PictureFormatSC Classification Scheme) <br> When this element is not provided in an XML instance document, the video format can be assumed to be "2D Video" |

| ScanType | A simple enumerarted type defining the allowable values of the ScanType element above. ScanType can take on the value interlaced or progressive |
|---|---|
| ColorTypeType | A simple enumerarted type defining the allowable values of the Colortype instantiated in the Color element above <br> Allowed value are: color - content was produced using a colour video format; blackAndWhite - the content was produced using a black and white video format; blackAndWhiteAndColor - the content contains a mixture of video that was originally produced in black and white; <br> colorized - the content was originally produced using a black and white video a programme: the orginal aspect ratio that the progrmme is available in and format and colour was added after original production |
| ColorType | A complex type, with a single attribute describing the colour format using one of the ColorTypeType values |
| Type | The type of colour format |
| RatioType | A data type that allows ratios to be specified in the form "h:v" where and v reprsent horizontal and vertical dimensions, respectively |
| AspectRatioType | Denotes the aspect ratio of the programme. This element can denote the aspect ratio of the original programme as well as that of its instances, through the use of type attribute |
| Type | Denotes whether the specified aspect ratio is associated with the original programme (original) or its published instance (publication). <br> The default value of the attribute is original |

FIG. 21

```
<complexType name="VideoAttributesType">
    <sequence>
        <element name="Coding" type="tva:ControlledTermType"
        miOccurs="0"/>
        <element name="Scan" type="tva:ScanType" miOccurs="0"/>
        <element name="HorizontalSize" type="unsignedShort"
        miOccurs="0"/>
        <element name="VerticalSize" type="unsignedShort"
        miOccurs="0"/>
        <element name="AspectRatio" type="tva:AspectRatioType"
        miOccurs="0" maxOccurs="2"/>
        <element name="Color" type="tva:ColorType" minOccurs="0"/>
        <element name="FrameRate" type="tva:FrameRateType" minOccurs="0"/>
        <element name="PictureFormat" type="tva:ControlledTermType" miOccurs="0"/>
    </sequence>
</complexType>
```

```
<simpleType name="ScanType">
    <restriction base="string">
        <enumeration value="interlaced"/>
        <enumeration value="progressive"/>
    </restriction>
</simpleType>

<simpleType name="ColorTypeType">
    <restriction base="string">
        <enumeration value="color"/>
        <enumeration value="blackAndWhite"/>
        <enumeration value="blackAndWhiteAndColor"/>
        <enumeration value="colorized"/>
    </restriction>
</simpleType>

<complexType name="ColorType">
    <attribute name="type" type="tva:ColorTypeType" use="required"/>
</complexType>

<singleType name="RatioType">
    <restriction base="string">
        <pattern value="\d+:\d+"/>
    </restriction>
</simpleType>

<complexType name="AspectRatioType">
    <simpleContent>
        <extension base="tva:RatioType">
            <attribute name="Type" use="optional" default="original">
                </simpleType>
                    <restriction base="string">
                        <enumeration value="original"/>
                        <enumeration value="publication"/>
                    </restriction>
                </simpleType>
            </attribute>
        </extension>
    </simpleContent>
</complexType>
```

FIG. 22

| AspectRatioOrgType/AspectRatioDisplayType | Description |
|---|---|
| 00 | 4:3 |
| 01 | 16:9 |
| 10 | 21:9 |
| 11 | reserved |

FIG. 23

| AFDBarType | Description |
|---|---|
| 00 | ASYMMETRIC SCALING |
| 01 | Crop |
| 10 | Letterbox EDITING |
| 11 | Pillarbax INSERTION |

FIG. 24

| Name | Definition |
|---|---|
| BitRateType | A complex type that defines the bit rate for a content item expressed in bits per second. The datavalue associated with this type difines the average bitrate if the bitrate is variable |
| Variable | Indicates whether the BitRate is variable of fixed. If the BitRate is variable, three optional attributes can be used to specify the minimum, maximum and average bitrates |
| minimum | Indicates the minimum numerical value for the BitRate in case of variable bit rate |
| average | Indicates the average numerical value for the BitRate in case of variable bit rate |
| maximum | Indicates the maximum numerical value for the BitRate in case of variable bit rate |

FIG. 25

| Name | Definition |
|---|---|
| Bit-depth | Define the number of bits used to express black to white<br>- 8 bits, 10 bits, 12 bits, etc. |
| HDR | Embodiment 1: divided into minimum luminance and maximum luminance ? min.luminance and max.luminance<br>Embodiment 2: specify profiles for dividing minimum luminance and maximum luminance<br>- Convertional capacity: min: $0.1cd/m^2$, max: $100cd/m^2$<br>- Mid capacity: min: $0.0001cd/m^2$, max: $10,000cd/m^2$<br>- High capacity: $0.0001cd/m^2$, max: $10,000cd/m^2$ |
| Color primary | Divide color coordinates expressing color<br>1. BT. 709, BT. 2020, DCI-P3, Custom<br>2. If the color coordinate is custom, x and y values for RGB and white points are further signaled (since x+y+z=1, the z value may not be signaled) |
| Chroma subsampling | Indicate the amount of information of the chroma component as compared to the luma component, upon encoding<br>- 4:2:0, 4:2:2, 4:4:4 |

METHOD AND APPARATUS FOR TRANSMITTING AND RECEIVING BROADCAST SIGNAL FOR PROVIDING HEVC BASED IP BROADCAST SERVICE

CROSS REFERENCE TO RELATED APPLICATIONS

This application is the National Phase of PCT International Application No. PCT/KR2014/010237, filed on Oct. 29, 2014, which claims priority under 35 U.S.C. 119(e) to U.S. Provisional Application Nos. 61/897,205, filed on Oct. 29, 2013 and 61/898,452, filed on Oct. 31, 2013, all of which are hereby expressly incorporated by reference into the present application.

TECHNICAL FIELD

The present invention relates to transmission and reception of a broadcast signal and, more particularly, to a method and apparatus for transmitting and receiving a broadcast signal for providing an HEVC based IP broadcast service.

BACKGROUND ART

HbbTV which is European hybrid TV obtained by combining real-time broadcast and data broadcast using a broadband network has been used and spread in each country. Europe, where private broadcast stations as well as public broadcast stations provide HbbTV services, has taken the lead in spreading of HbbTV in the market. Due to low development costs and rapid commercial service release, broadcast stations of Eastern Europe as well as the United Kingdom and Switzerland are interested in HbbTV. Recently, technology of adding action recognition, personalization, multi screen, etc. to HbbTV was published.

HbbTV means a hybrid TV technical standard or service which begins to be provided by French and German broadcast stations for the purpose of combining content/service of an existing broadcast and content/service of the Internet to create a new broadcast, as can be seen from the name "hybrid broadcast broadband".

The HbbTV standard is advantageous in development costs and time-to-market because a small number of new technical elements is introduced to establish the standard and existing qualified standards are mostly reused. However, since the current HbbTV standard only provides SD/HD 25 fps based on an AVC codec, there is a need for providing a high-quality media service based on HEVC according to the trend of consumers requiring high quality.

DISCLOSURE

Technical Problem

An object of the present invention devised to solve the problem lies in a method and/or apparatus for transmitting and receiving a broadcast signal in order to provide an HEVC based broadcast service.

Another object of the present invention devised to solve the problem lies in a high-quality broadcast service by further defining a video profile suitable for an HEVC based service.

Another object of the present invention devised to solve the problem lies in a high-quality broadcast service by further defining video attributes suitable for an HEVC based service.

Another object of the present invention devised to solve the problem lies in a signaling method for confirming an HEVC based service at a system level.

Another object of the present invention devised to solve the problem lies in a signaling method for confirming the characteristics of an HEVC based service at the system level.

Another object of the present invention devised to solve the problem lies in a method for transmitting information on an HEVC based service via an IP network.

Technical Solution

The object of the present invention can be achieved by providing a broadcast signal transmission method including encoding video data and generating a video stream, generating signaling information including any one of information indicating that the generated video stream is a high efficiency video coding (HEVC) video stream, information indicating characteristics of the generated video stream and information indicating that a broadcast service based on the generated video stream is an HEVC based broadcast service, multiplexing the generated video stream and signaling information, and transmitting the multiplexed broadcast stream.

The signaling information may include at least one of a program map table (PMT), an event information table (EIT) and a service description table (SDT), the PMT may include information indicating the HEVC video stream, the EIT may include the characteristics of the video stream, and the SDT may include the information indicating the HEVC based broadcast service.

The signaling information may include information indicating a high dynamic range of the generated video stream.

The signaling information may include color management information for improved color expression of the generated video stream.

The information indicating the characteristics of the video stream may include codec information, resolution information, frame rate information and information indicating the number of bits used to express a color from black to white.

The information indicating the characteristics of the video stream may include tier information identifying whether the generated video stream is a stream for broadcast or a stream for storage.

The signaling information may have a table section format or xml format.

In another aspect of the present invention, provided herein is a broadcast signal reception apparatus including a receiver configured to receive a multiplexed broadcast stream, a demultiplexer configured to extract a video stream and signaling information from the multiplexed broadcast stream, the signaling information including signaling information including any one of information indicating that the extracted video stream is a high efficiency video coding (HEVC) video stream, information indicating characteristics of the extracted video stream and information indicating that a broadcast service based on the extracted video stream is an HEVC based broadcast service, and a video decoder configured to decode the extracted video stream using the extracted signaling information.

The signaling information may include at least one of a program map table (PMT), an event information table (EIT) and a service description table (SDT), the PMT may include information indicating the HEVC video stream, the EIT may include the characteristics of the video stream, and the SDT may include the information indicating the HEVC based broadcast service.

The signaling information may include information indicating a high dynamic range of the generated video stream.

The signaling information may include color management information for improved color expression of the generated video stream.

The information indicating the characteristics of the video stream may include codec information, resolution information, frame rate information and information indicating the number of bits used to express a color from black to white.

The information indicating the characteristics of the video stream may include tier information identifying whether the generated video stream is a stream for broadcast or a stream for storage.

The signaling information may have a table section format or xml format.

In another aspect of the present invention, provided herein is a broadcast signal transmission apparatus including an encoder configured to encode video data and generating a video stream, a signaling information generator configured to generate signaling information including any one of information indicating that the generated video stream is a high efficiency video coding (HEVC) video stream, information indicating characteristics of the generated video stream and information indicating that a broadcast service based on the generated video stream is an HEVC based broadcast service, a multiplexer configured to multiplex the generated video stream and signaling information, and a transmitter configured to transmit the multiplexed broadcast stream.

In another aspect of the present invention, provided herein is a broadcast signal reception method including receiving a multiplexed broadcast stream, extracting a video stream and signaling information from the multiplexed broadcast stream, the signaling information including signaling information including any one of information indicating that the extracted video stream is a high efficiency video coding (HEVC) video stream, information indicating characteristics of the extracted video stream and information indicating that a broadcast service based on the extracted video stream is an HEVC based broadcast service, and decoding the extracted video stream using the extracted signaling information.

Advantageous Effects

According to the embodiments of the present invention, it is possible to provide an HEVC based broadcast service.

According to the embodiments of the present invention, it is possible to provide a high-quality HEVC based broadcast service using a video profile suitable for an HEVC based service.

According to the embodiments of the present invention, it is possible to provide a high-quality HEVC based broadcast service using video attributes suitable for an HEVC based service.

According to the embodiments of the present invention, it is possible to confirm an HEVC based service at a system level.

According to the embodiments of the present invention, it is possible to confirm the characteristics of an HEVC based service at the system level.

According to the embodiments of the present invention, it is possible to transmit an HEVC based service and/or information on an HEVC based service via a broadcast network and/or an IP network.

DESCRIPTION OF DRAWINGS

FIG. 1 is diagram showing the configuration of a program map table (PMT) according to one embodiment of the present invention.

FIG. 2 is a diagram showing the configuration of an event information table (EIT) according to one embodiment of the present invention.

FIG. 3 is a diagram showing the configuration of a component_descriptor according to one embodiment of the present invention.

FIG. 4 is a diagram showing a description of stream_content and a component_type according to one embodiment of the present invention.

FIG. 5 is a diagram showing the configuration of a high dynamic range descriptor including high dynamic range information according to one embodiment of the present invention.

FIG. 6 is a diagram showing the configuration of high dynamic range information (dynamic_range_transformation_metadata) according to one embodiment of the present invention.

FIG. 7 is a diagram showing the configuration of a color management information descriptor including color management information according to one embodiment of the present invention.

FIG. 8 is a diagram showing the configuration of color management information (color_management_metadata) according to one embodiment of the present invention.

FIG. 9 is a diagram showing the configuration of a service description table (SDT) according to one embodiment of the present invention.

FIG. 10 is a diagram showing the configuration of a service_descriptor according to one embodiment of the present invention.

FIG. 11 is a diagram illustrating a service_type for identifying an HEVC based broadcast service according to one embodiment of the present invention.

FIG. 12 is a diagram showing system formats, video formats and audio formats used in HbbTV according to one embodiment of the present invention.

FIG. 13 is a diagram showing system formats, video formats and audio formats used in a video system having a frame rate of 25 Hz according to one embodiment of the present invention.

FIG. 14 is a diagram showing system formats, video formats and audio formats used in a video system having a frame rate of 30 Hz according to one embodiment of the present invention.

FIG. 15 is a diagram showing a video format for providing an HEVC service according to one embodiment of the present invention in xml format.

FIG. 16 is a diagram showing a video format using a termID according to one embodiment of the present invention.

FIG. 17 is a diagram showing a video format using a termID in order to provide an HEVC based broadcast service according to one embodiment of the present invention.

FIG. 18 is a diagram showing a video profile for providing an HEVC service according to one embodiment of the present invention.

FIG. 20 is a diagram showing a description of a video attribute according to one embodiment of the present invention.

FIG. 21 is a diagram showing a video attribute according to one embodiment of the present invention in xml format.

FIG. 22 is a diagram showing an AspectRatioOrgType and an AspectRatioDisplayType according to one embodiment of the present invention.

FIG. 23 is a diagram showing an AFDBarType according to one embodiment of the present invention.

FIG. 24 is a diagram showing a BitRateType according to one embodiment of the present invention.

FIG. 25 is a diagram showing video attributes for providing a UHD service according to one embodiment of the present invention.

BEST MODE

Figure 19:
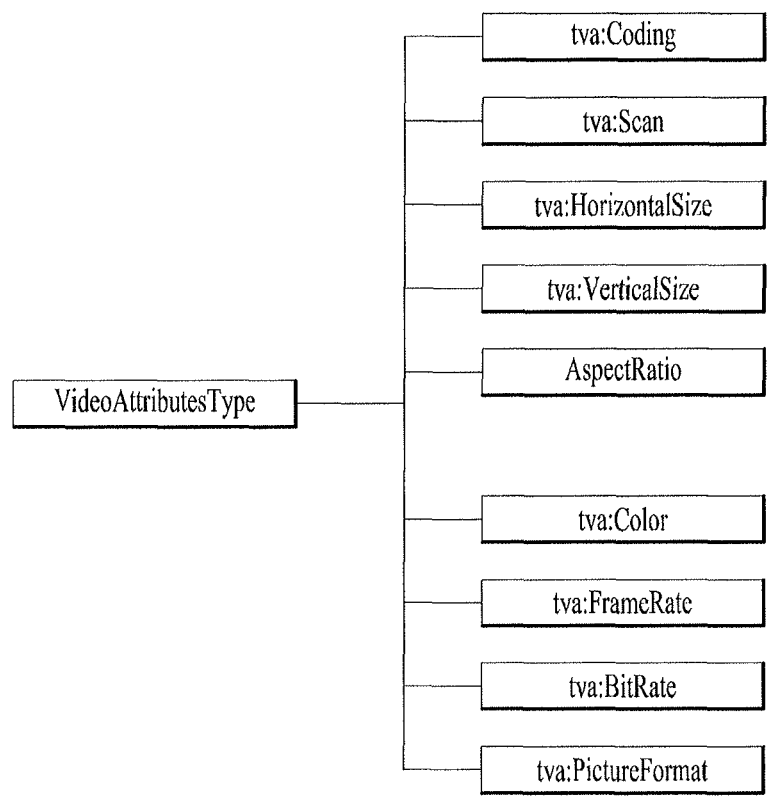
FIG. 19 is a diagram showing a video attribute type according to one embodiment of the present invention.

Hereinafter, exemplary embodiments of the present invention will be described with reference to the accompanying drawings. The configuration and operation of the present invention shown in the drawings and described hereinafter will be described in at least one embodiment, without limiting the spirit and scope of the present invention.

Although the terms used in the present invention are selected from generally known and used terms, terms used herein may vary depending on operator's intention or customs in the art, appearance of new technology, or the like. In addition, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meanings of each term lying within.

FIG. 1 is diagram showing the configuration of a program map table (PMT) according to one embodiment of the present invention.

The PMT according to one embodiment of the present invention includes a table_id field, a section_syntax_indicator field, a section_length field, a program_number field, a version_number field, a current_next_indicator field, a section_number field, a last_section_number field, a PCR_PID field, a program_info_length field, a descriptor( ), stream_type field, an elementary_PID field, an ES_info_length field, a descriptor( ) and/or a CRC_32 field.

The table_id field identifies the type of a table. The table_id field may serve to indicate that this table section configures the PMT.

The section_syntax_indicator field indicates the format of a table section following this field. When the value of this field is 0, this indicates that this table section is in a short format and, when the value of this field is 1, this indicates that this table section is in a long format.

The section_length field indicates the length of this table section. The section_length field indicates the length from this field to the end of this table section and thus the actual length of this table section may be a value obtained by adding 3 bytes to a value indicated by the section_length field.

The program_number field identifies each program service or virtual channel present in a transform stream.

The version_number field indicates the version number of a private table section. A receiver may find a most recent table from table sections stored in a memory using this field and the below-described current_next_indicator field.

When the value of the current_next_indicator field is 1, this indicates that a currently transmitted table is valid and, when the value of the current_next_indicator field is 0, this indicates that a currently transmitted table is currently invalid but will be valid in the future.

The section_number field indicates in what order this section is in this table.

The last_section_number field indicates the number of the last section among the sections configuring this table.

The PCR_PID field indicates a packet ID where a program clock reference (PCR) for a program service is present.

The program_info_length field indicates the length of a descriptor indicating program information (program_info) following this field.

The descriptor( ) means a descriptor including information on a program corresponding to this table section.

The stream_type field indicates the type of each elementary stream configuring a program described by this table. This field may indicate that a video stream configuring a program is a video stream encoded by an HEVC codec, that is, an HEVC video stream. For example, this field may have a value of 0×24 or 0×25. When the field of this field is 0×24, this field may indicate that this video stream is an HEVC video stream or an HEVC temporal video sub-bitstream. When the value of this field is 0×25, this field may indicate that this video stream is an HEVC temporal video subset of an HEVC video stream according to one embodiment of the present invention. The HEVC temporal video sub-bitstream may mean a substream included in one video stream. That is, HEVC autonomously provides temporal scalability and a stream defined by one temporal id may mean a sub-bitstream. The above-described HEVC temporal video subset may mean a stream which is not included in the above-described sub-bitstream. Here, one of the above-described subsets may become one stream, several subsets may become one stream, or one subset may become several streams.

The elementary_PID field indicates the packet ID of each elementary stream configuring a program describing this table.

The ES_info_length field indicates the length of a descriptor indicating information (ES_info) one elementary stream following this field.

The descriptor( ) means a descriptor indicating information on one elementary stream configuring a program describing this table.

The CRC_32 field indicates a CRC value used to determine whether an error occurs in data included in this table section.

The PMT according to one embodiment of the present invention may be transmitted in band via an MPEG-TS and all PSI information including the PMT may be transmitted via IP in xml format.

FIG. 2 is a diagram showing the configuration of an event information table (EIT) according to one embodiment of the present invention.

The EIT according to one embodiment of the present invention includes a table_id field, a section_syntax_indicator field, a section_length field, a service_id field, a version_number field, a current_next_indicator field, a section_number field, a last_section_number field, a transport_ stream_id field, an original_network_id field, a segment_last_section_number field, a last_table_id field, event_id field, a start_time field, a duration field, a running_status field, a free_CA_mode field, a descriptors_loop_length field, a descriptor( ) and/or a CRC_32 field.

The table_id field identifies the type of a table. The table_id field may serve to indicate that this table section configures the EIT.

The section_syntax_indicator field indicates the format of a table section following this field. When the value of this field is 0, this indicates that this table section is in a short format and, when the value of this field is 1, this indicates that this table section is in a long format.

The section_length field indicates the length of this table section. The section_length field indicates the length from this field to the end of this table section.

The service_id field identifies each service present in a transport stream. The service_id field may have the same function as the program_number field of the PMT.

The version_number field indicates the version number of a private table section. A receiver may find a most recent table from table sections stored in a memory using this field and the below-described current_next_indicator field.

When the value of the current_next_indicator field is 1, this indicates that a currently transmitted table is valid and, when the value of the current_next_indicator field is 0, this indicates that a currently transmitted table is currently invalid but will be valid in the future.

The section_number field indicates in what order this section is in this table.

The last_section_number field indicates the number of the last section among the sections configuring this table.

The transport_stream_id field identifies a transport stream (TS) to be described in this table.

The original_network_id field may identify an original broadcast station for transmitting a service or event described in this table.

The segment_last_section_number field indicates the last section number of this segment when a sub table is present. When the sub table is not segmented, the value of this field may be equal to that of the last_section_number field.

The last_table_id field indicates a used last table_id.

The event_id field identifies each event and has a unique value in one service.

The start_time field indicates the start time of this event.

The duration field indicates the duration of this event. For example, when the duration of a program is 1 hour 45 minutes 30 seconds, the value of the duration field is 0x014530.

The running_status field indicates the status of this event.

When the value of the free_CA_mode field is 0, this indicates that component streams configuring the service are not scrambled and, when the value of the free_CA_mode field is 1, this indicates that access to one or more streams is adjusted by a CA system. The CA system is an abbreviation for conditional access system and means a system for providing an encryption function of broadcast content in order to enable only a contractor to view a broadcast and a function for enabling only a contractor to perform decryption to view broadcast content.

The descriptors_loop_length field indicates a value obtained by adding the lengths of the descriptors following this field.

The descriptor( ) means a descriptor describing each event. The component_descriptor according to one embodiment of the present invention may correspond to the above-described descriptor( ). The above-described component_descriptor may be located in the EIT and indicate the characteristics of a video or audio stream included in this event. The component descriptor will be described in greater detail below. The below-described high dynamic range descriptor and color management information descriptor may correspond to the above-described descriptor( ).

The CRC_32 field indicates a CRC value used to determine whether an error occurs in data included in this table section.

The EIT according to one embodiment of the present invention may be transmitted in a TS in table format and may be transmitted by IP streaming in xml format.

FIG. 3 is a diagram showing the configuration of a component_descriptor according to one embodiment of the present invention.

The component descriptor according to one embodiment of the present invention includes a descriptor_tag field, a descriptor_length field, a stream_content field, a component_type field, a component_tag field, an ISO_639_language_code field and/or a text_char field.

The descriptor_tag field identifies that this descriptor is a component descriptor according to one embodiment of the present invention.

The descriptor_length field may indicate the length of this descriptor.

The stream_content field may indicate the type of a stream.

The component_type field may indicate the type of video or audio data.

The component_tag field has the same value as the component_tag field of a stream identifier descriptor.

The ISO_639_language_code field may identify the language of a component.

The text_char field may indicate a text description of a component stream.

One embodiment of the present invention may signal information on an HEVC codec based video stream using a stream_content field and a component_type field. That is, one embodiment of the present invention may confirm the characteristics of the video stream included in this event or service using the two fields described above. The stream_content field and the component_type field according to one embodiment of the present invention may indicate the characteristics of the video stream and, more particularly, codec information, resolution information, frame rate information, bit depth information, tier information, etc. of the video stream. Here, the bit depth information may mean the number of bits used to indicate the color from black to white and the tier information may mean information for determining whether this video stream is a broadcast stream or a stream stored in a receiver.

The reception apparatus according to one embodiment of the present invention may determine whether this event may be decoded using information included in the above-described component descriptor.

FIG. 4 is a diagram showing a description of stream_content and a component_type according to one embodiment of the present invention.

When the stream_content field according to one embodiment of the present invention is 0x09, this field may indicate that this video stream is an HEVC video stream.

The component_type field according to one embodiment of the present invention may be defined from 0x01 to 0x20. When the component_type field is 0x01, this field may indicate that this video stream has HEVC SD resolution, an aspect ratio of 4:3, a frame rate of 25 Hz and a bit depth of 8 bits. When the component_type field is 0x2, this field may indicate that this video stream has HEVC SD resolution, an aspect ratio of 16:9, a frame rate of 25 Hz and a bit depth of 8 bits. When the component_type field is 0×3, this field may indicate that this video stream has HEVC SD resolution, an aspect ratio of 16:9 or more, a frame rate of 25 Hz and a bit depth of 8 bits. When the component_type field is 0×4, this field may indicate that this video stream has HEVC SD resolution, an aspect ratio of 4:3, a frame rate of 30 Hz and a bit depth of 8 bits. When the component_type field is 0×5, this field may indicate that this video stream has HEVC SD resolution, an aspect ratio of 16:9, a frame rate of 30 Hz and a bit depth of 8 bits. When the component_type field is 0×6, this field may indicate that this video stream has HEVC SD resolution, an aspect ratio of 16:9 or more, a frame rate of 30 Hz and a bit depth of 8 bits. When the component_type field is 0×7, this field may indicate that this video stream has HEVC HD resolution, an aspect ratio of 4:3 or 16:9, a frame rate of 25 Hz and a bit depth of 8 bits. When the component_type field is 0×8, this field may indicate that this video stream has HEVC HD resolution, an aspect ratio of 16:9 or more, a frame rate of 25 Hz and a bit depth of 8 bits. When the component_type field is 0×9, this field may indicate that this video stream has HEVC HD resolution, an aspect ratio of 4:3, a frame rate of 30 Hz and a bit depth of 8 bits. When the component_type field is 0×0A, this field may indicate that this video stream has HEVC HD resolution, an aspect ratio of 16:9, a frame rate of 30 Hz and a bit depth of 8 bits. When the component_type field is 0×0B, this field may indicate that this video stream has HEVC HD resolution, an aspect ratio of 16:9 or more, a frame rate of 30 Hz and a bit depth of 8 bits. When the component_type field is 0×11, this field may indicate that this video stream has HEVC 4K UHD resolution, an aspect ratio of 16:9, a frame rate of 25 Hz and a bit depth of 8 bits. When the component_type field is 0×12, this field may indicate that this video stream has HEVC 4K UHD resolution, an aspect ratio of a wide screen (16:9 or more), a frame rate of 25 Hz and a bit depth of 8 bits. When the component_type field is 0×13, this field may indicate that this video stream has HEVC 4K UHD resolution, an aspect ratio of 16:9, a frame rate of 30 Hz and a bit depth of 8 bits. When the component_type field is 0×14, this field may indicate that this video stream has HEVC 4K UHD resolution, an aspect ratio of a wide screen (16:9 or more), a frame rate of 30 Hz and a bit depth of 8 bits. When the component_type field is 0×15, this field may indicate that this video stream has HEVC 4K UHD resolution, an aspect ratio of 16:9, a frame rate of 50 Hz and a bit depth of 8 bits. When the component_type field is 0×16, this field may indicate that this video stream has HEVC 4K UHD resolution, an aspect ratio of a wide screen (16:9 or more), a frame rate of 50 Hz and a bit depth of 8 bits. When the component_type field is 0×17, this field may indicate that this video stream has HEVC 4K UHD resolution, an aspect ratio of 16:9, a frame rate of 60 Hz and a bit depth of 8 bits. When the component_type field is 0×18, this field may indicate that this video stream has HEVC 4K UHD resolution, an aspect ratio of a wide screen (16:9 or more), a frame rate of 60 Hz and a bit depth of 8 bits. When the component_type field is 0×19, this field may indicate that this video stream has HEVC 4K UHD resolution, an aspect ratio of 16:9, a frame rate of 25 Hz and a bit depth of 10 bits. When the component_type field is 0×1A, this field may indicate that this video stream has HEVC 4K UHD resolution, an aspect ratio of a wide screen (16:9 or more), a frame rate of 25 Hz and a bit depth of 10 bits. When the component_type field is 0×1B, this field may indicate that this video stream has HEVC 4K UHD resolution, an aspect ratio of 16:9, a frame rate of 30 Hz and a bit depth of 10 bits. When the component_type field is 0×1C, this field may indicate that this video stream has HEVC 4K UHD resolution, an aspect ratio of a wide screen (16:9 or more), a frame rate of 30 Hz and a bit depth of 10 bits. When the component_type field is 0×1D, this field may indicate that this video stream has HEVC 4K UHD resolution, an aspect ratio of 16:9, a frame rate of 50 Hz and a bit depth of 10 bits. When the component_type field is 0×1E, this field may indicate that this video stream has HEVC 4K UHD resolution, an aspect ratio of a wide screen (16:9 or more), a frame rate of 50 Hz and a bit depth of 10 bits. When the component_type field is 0×1F, this field may indicate that this video stream has HEVC 4K UHD resolution, an aspect ratio of 16:9, a frame rate of 60 Hz and a bit depth of 10 bits. When the component_type field is 0×20, this field may indicate that this video stream has HEVC 4K UHD resolution, an aspect ratio of a wide screen (16:9 or more), a frame rate of 60 Hz and a bit depth of 10 bits.

The component_type according to the present invention is based on the video stream of the chroma format of 4:2:0 for 4K UHD. Another embodiment of the present invention may assign 0×21 to 0×29 to the component_type to further define the bit depth of 12 bits. In addition, 0×29 to 0×38 may be assigned to the component_type to further include the chroma format of 4:2:2 for 4K UHD. In addition, 0×38 to 0×47 may be assigned to the component_type to further include an 8K UHD video stream.

FIG. 5 is a diagram showing the configuration of a high dynamic range descriptor including high dynamic range information according to one embodiment of the present invention.

The dynamic_range_transformation_info_descriptor according to one embodiment of the present invention may be referred to as a high dynamic range descriptor.

The high dynamic range descriptor according to one embodiment of the present invention includes a descriptor_tag field, a descriptor_length field, a number_of_HDR_info field and/or a dynamic_range_transformation_metadata field (high dynamic range information).

The descriptor_tag field identifies that this descriptor is the high dynamic range descriptor according to one embodiment of the present invention.

The descriptor_length field may indicate the length of this descriptor.

The number_of_HDR_info field may indicate the number of high dynamic range information.

The dynamic_range_transformation_metadata field may be referred to as high dynamic range information according to one embodiment of the present invention, which will be described in detail below.

The high dynamic range descriptor according to one embodiment of the present invention may be included in the EIT. The high dynamic range information according to one embodiment of the present invention may be added to the above-described component_type. However, in order to prevent the component_type from continuously increasing, the high dynamic range information may be independently signaled at the descriptor level of the EIT.

FIG. 6 is a diagram showing the configuration of high dynamic range information (dynamic_range_transformation_metadata) according to one embodiment of the present invention.

The dynamic_range_transformation_metadata according to one embodiment of the present invention may be referred to as high dynamic range information.

The high dynamic range information according to one embodiment of the present invention includes a luminance_max field, a luminance_min field, a luminance_upper_bound field, a luminance_lower_bound field, a number_luminance_upper_bound_diff field and/or a luminance_upper_bound_diff[i] field.

The luminance_max field indicates maximum reference luminance expressed in this video stream, that is, the maximum value of a dynamic range (DR).

The luminance_min field indicates minimum reference luminance expressed in this video stream, that is, the minimum value of a dynamic range (DR).

The luminance_upper_bound field indicates an upper bound value (in nits) of an essentially expressed dynamic range of the dynamic range expressed in this video stream.

The luminance_lower_bound field indicates a lower bound value (in nits) of an essentially expressed dynamic range of the dynamic range expressed in this video stream.

The number_luminance_upper_bound_diff field indicates the number of variables used to extend the luminance_upper_bound field or the luminance_lower_bound field.

The luminance_upper_bound_diff[i] field indicates information on a region extended by extending the luminance_upper_bound field or the luminance_lower_bound field.

The high dynamic range information according to one embodiment of the present invention may indicate information indicating the high dynamic range of the video stream and may be included in the high dynamic range descriptor of the EIT.

FIG. 7 is a diagram showing the configuration of a color management information descriptor including color management information according to one embodiment of the present invention.

The UHD_color_management_info_descriptor according to one embodiment of the present invention may be referred to as a color management information descriptor.

The color management information descriptor according to one embodiment of the present invention includes a descriptor_tag field, a descriptor_length field, a number_of_color_info field and/or a color_management_metadata field (color management information).

The descriptor_tag field identifies that this descriptor is a color management information descriptor according to one embodiment of the present invention.

The descriptor_length field may indicate the length of this descriptor.

The number_of_color_info field may indicate the number of color management information.

The color_management_metadata field may be referred to as color management information according to one embodiment of the present invention, which will be described in detail below.

The color management information descriptor according to one embodiment of the present invention may be included in the EIT. The color management information according to one embodiment of the present invention may be added to the above-described component_type. However, in order to prevent the component_type from continuously increasing, the color management information may be independently signaled at the descriptor level of the EIT.

FIG. 8 is a diagram showing the configuration of color management information (color_management_metadata) according to one embodiment of the present invention.

The color_management_metadata according to one embodiment of the present invention may be referred to as color management information.

The color management information according to one embodiment of the present invention includes a gamut_mapping_flag field, a reference_black_luminance_level field, a reference_white_luminance_level field, a color gamut field, a color_primary_r_x field, a color_primary_r_y field, a color_primary_g_x field, a color_primary_g_y field, a color_primary_b_x field and/or a color_primary_b_y field.

The gamut_mapping_flag field indicates whether gamut better than basic gamut is used. When the value of the gamut_mapping_flag field is "0", this indicates that basic gamut is used and, when the value of the gamut_mapping_flag field is "1", this indicates that arbitrary gamut is used.

The reference_black_luminance_level field may indicate minimum luminance of a recommended display dynamic range necessary to reproduce this video stream.

The reference_white_luminance_level field may indicate maximum luminance of a recommended display dynamic range necessary to reproduce this video stream.

The color gamut field indicates a standard color space capable of expressing the color of this video stream. This field may indicate the color expression range of the display and/or the locations of basic colors (red, green and blue) in the color space.

The color_primary_r_x field indicates an x coordinate of red in an arbitrary color space when the arbitrary color space is specified instead of the standard color space.

The color_primary_r_y field indicates a y coordinate of red in an arbitrary color space when the arbitrary color space is specified instead of the standard color space.

The color_primary_g_x field indicates an x coordinate of green in an arbitrary color space when the arbitrary color space is specified instead of the standard color space.

The color_primary_g_y field indicates a y coordinate of green in an arbitrary color space when the arbitrary color space is specified instead of the standard color space.

The color_primary_b_x field indicates an x coordinate of blue in an arbitrary color space when the arbitrary color space is specified instead of the standard color space.

The color_primary_b_y field indicates a y coordinate of blue in an arbitrary color space when the arbitrary color space is specified instead of the standard color space.

The color management information according to one embodiment of the present invention may be included in the color management information of the EIT.

FIG. 9 is a diagram showing the configuration of a service description table (SDT) according to one embodiment of the present invention.

The SDT according to one embodiment of the present invention includes a table_id field, a section_syntax_indicator field, a section_length field, a transport_stream_id field, a version_number field, a current_next_indicator field, a section_number field, a last_section_number field, an original_network_id field, a service_id field, an EIT_schedule_flag field, an EIT_present_following_flag field, a running_status field, a free_CA_mode field, a descriptors_loop_length field, a descriptor( ) and/or a CRC_32 field.

The table_id field identifies the type of a table. The table_id field may serve to indicate that this table section configures the SDT.

The section_syntax_indicator field indicates the format of a table section following this field. When the value of this field is 0, this indicates that this table section is in a short format and, when the value of this field is 1, this indicates that this table section is in a long format.

The section_length field indicates the length of this table section. The section_length field indicates the length from this field to the end of this table section.

The transport_stream_id field identifies a transport stream (TS) to be described in this table.

The version_number field indicates the version number of a private table section. A receiver may find a most recent table from table sections stored in a memory using this field and the below-described current_next_indicator field.

When the value of the current_next_indicator field is 1, this indicates that a currently transmitted table is valid and, when the value of the current_next_indicator field is 0, this indicates that a currently transmitted table is currently invalid but will be valid in the future.

The section_number field indicates in what order this section is in this table.

The last_section_number field indicates the number of the last section among the sections configuring this table.

The original_network_id field may identify an original broadcast station for transmitting a service or event described in this table.

The service_id field identifies each service present in a transport stream. The service_id field may have the same function as the program_number field of the PMT.

When the value of the EIT_schedule_flag field is 1, this indicates that an EIT schedule flag for a service is present in a current TS and, when the value of the EIT_schedule_flag field is 0, this indicates that an EIT schedule flag for a service is not present in a current TS.

When the value of the EIT_present_following_flag field is 1, this indicates that EIT_present_following information for a service is present in a current TS and, when the value of the EIT_present_following_flag field is 0, this indicates that EIT_present_following information for a service is not present in a current TS.

The running_status field indicates the status of a service. For example, when the value of the running_state field is 1, this indicates that the service is "not running" and, when the value of the running_state field is 2, this indicates that the service is "starts in a few seconds". When the value of the running_state field is 3, this indicates that the service is "pausing" and, when the value of the running_state field is 4, this indicates that the service is "running". When the value of the running_state field is 5, this indicates that the service is "service off-air".

When the value of the free_CA_mode field is 0, this indicates that component streams configuring the service are not scrambled and, when the value of the free_CA_mode field is 1, this indicates that access to one or more streams is adjusted by a CA system. The CA system is an abbreviation for conditional access system and means a system for providing an encryption function of broadcast content in order to enable only a contractor to view a broadcast and a function for enabling only a contractor to perform decryption to view broadcast content.

The descriptors_loop_length field indicates a value obtained by adding the lengths of the descriptors following this field.

The descriptor( ) means a descriptor describing each service. The service_descriptor according to one embodiment of the present invention may correspond to the above-described descriptor( ). This will be described in greater detail below with reference to the subsequent figures.

The CRC_32 field indicates a CRC value used to determine whether an error occurs in data included in this table section.

FIG. 10 is a diagram showing the configuration of a service_descriptor according to one embodiment of the present invention.

The service_descriptor according to one embodiment of the present invention includes a descriptor_tag field, a descriptor_length field, a service_type field, a service_provider_name_length field and a service_name_length field.

The descriptor_tag field may identify this descriptor.

The descriptor_length field may indicate the length of this descriptor.

The service_type field may indicate that this service is an HEVC broadcast service. According to one embodiment of the present invention, this field may indicate that the broadcast service based on this video stream is an HEVC based broadcast service. This field will be described in detail below.

The service_provider_name_length field may indicate the length of a service provider name represented by the following char.

The service_name_length field may indicate the length of a service name represented by the following char.

The SDT according to one embodiment of the present invention may be transmitted in a TS in a table format and may be transmitted by IP streaming in xml format.

FIG. 11 is a diagram illustrating a service_type for identifying an HEVC based broadcast service according to one embodiment of the present invention.

The service_type according to one embodiment of the present invention may correspond to information indicating that the broadcast service based on the video stream is an HEVC based broadcast service.

When the service_type according to one embodiment of the present invention is 0×1F, this field may indicate that this broadcast service is a digital television service which uses an H.265/HEVC codec and has SD resolution. When the service_type is 0×20, this field may indicate that this broadcast service is an NVOD time-shifted service which uses an H.265/HEVC codec and has SD resolution. When the service_type is 0×21, this field may indicate that this broadcast service is an NVOD reference service which uses an H.265/HEVC codec and has SD resolution. When the service_type is 0×22, this field may indicate that this broadcast service is a digital television service which uses an H.265/HEVC codec and has HD resolution. When the service_type is 0×23, this field may indicate that this broadcast service is an NVOD time-shifted service which uses an H.265/HEVC codec and has HD resolution. When the service_type is 0×24, this field may indicate that this broadcast service is an NVOD reference service which uses an H.265/HEVC codec and has HD resolution. When the service_type is 0×25, this field may indicate that this broadcast service is a digital television service which uses an H.265/HEVC codec and has UHD-1A resolution. When the service_type is 0×26, this field may indicate that this broadcast service is an NVOD time-shifted service which uses an H.265/HEVC codec and has UHD-1A resolution. When the service_type is 0×27, this field may indicate that this broadcast service is an NVOD reference service which uses an H.265/HEVC codec and has UHD-1A resolution. When the service_type is 0×28, this field may indicate that this broadcast service is a digital television service which uses an H.265/HEVC codec and has UHD-1B resolution. When the service_type is 0×29, this field may indicate that this broadcast service is an NVOD time-shifted service which uses an H.265/HEVC codec and has UHD-1B resolution. When the service_type is 0×2A, this field may indicate that this broadcast service is an NVOD reference service which uses an H.265/HEVC codec and has 4K resolution and UHD-1B resolution. Here, UHD-1A may indicate a frame rate of 50p/60p and UHD-1B may indicate 4K resolution and a frame rate of 100p/120p. In addition, a broadcast service having 4K resolution and 25p/30p and a broadcast service having 8K resolution may also be signaled.

FIG. 12 is a diagram showing system formats, video formats and audio formats used in HbbTV according to one embodiment of the present invention.

According to one embodiment of the present invention, when an MPEG-2 TS is used as a system format, AVC_SD_25 and/or AVC_HD_25 may be used as a video format, HEAAC and/or E-AC3 may be used as an audio format and video/mpeg may be used as a MIME Type. When the MPEG-2 TS is used as the system format, terminals can support the same subtitle formats for content received by the broadband connection as are supported for the broadcast connection. When MP4 is used as a system format, AVC_SD_25 and/or AVC_HD_25 may be used as a video format, HEAAC and/or E-AC3 may be used as an audio format and video/mp4 may be used as a MIME Type. For example, video format AVC_SD_25 may indicate a video stream which uses an AVC codec, has SD resolution and has a frame rate of 25 fps.

According to one embodiment of the present invention, terminals can support E-AC3 for content received by the broadband connection when E-AC3 is supported for the broadcast connection.

FIG. 13 is a diagram showing system formats, video formats and audio formats used in a video system having a frame rate of 25 Hz according to one embodiment of the present invention.

According to one embodiment of the present invention, when an MPEG-2 TS is used as a system format, AVC_HD_25, AVC_SD_25, AVC_SP_25 and/or AVC_3D_25 may be used as a video format, HEAAC, HEAAC2, HEAAC_MPS, MPEG1_L2, MPEG1_L2_MPS, AC3, E-AC3 and/or DTS may be used as an audio format and video/mpeg or video/mp2t may be used as a MIME Type. When TTS is used as a system format, AVC_HD_25, AVC_SD_25, AVC_SP_25 and/or AVC_3D_25 may be used as a video format, HEAAC, HEAAC2, HEAAC_MPS, MPEG1_L2, MPEG_L2 MPS, AC3, E-AC3 and/or DTS may be used as an audio format and video/vnd.dlna.mpeg-tts may be used as a MIME Type. When MP4 is used as a system format, AVC_HD_25, AVC_SD_25, AVC_SP_25 and/or AVC_3D_25 may be used as a video format, HEAAC, HEAAC2, HEAAC_MPS, MPEG1_L2, MPEG1_L2_MPS, AC3, E-AC3 and/or DTS may be used as an audio format and video/mp4 may be used as a MIME Type.

According to one embodiment of the present invention, when an MPEG-2 TS is used as a system format, MPEG2_SD_25 and/or MPEG2_SP_25 may be used as a video format, MPEG1_L2, MPEG1_L2_MPS, AC3 and/or E-AC3 may be used as an audio format and video/mpeg or video/mp2t may be used as a MIME Type. When TTS is used as a system format, MPEG2_SD_25 and/or MPEG2_SP_25 may be used as a video format, MPEG1_L2, MPEG1_L2_MPS, AC3 and/or E-AC3 may be used as an audio format and video/vnd.dlna.mpeg-tts may be used as a MIME Type.

According to one embodiment of the present invention, among the video formats shown in this figure, when TS and/or MP4 are used as a system format, AVC_HD_25 and/or AVC_SD 25 may be used for HbbTV according to one embodiment of the present invention.

FIG. 14 is a diagram showing system formats, video formats and audio formats used in a video system having a frame rate of 30 Hz according to one embodiment of the present invention.

According to one embodiment of the present invention, when an MPEG-2 TS is used as a system format, AVC_HD_30, AVC_SD_30, AVC_SP_30 and/or AVC_3D_30 may be used as a video format, HEAAC, HEAAC2, HEAAC_MPS, MPEG1_L2, MPEG1_L2_MPS, AC3, E-AC3 and/or DTS may be used as an audio format, and video/mpeg or video/mp2t may be used as a MIME Type. When TTS is used as a system format, AVC_HD_30, AVC_SD_30, AVC_SP_30 and/or AVC_3D_30 may be used as a video format, HEAAC, HEAAC2, HEAAC_MPS, MPEG1_L2, MPEG1 L2 MPS, AC3, E-AC3 and/or DTS may be used as an audio format, and video/vnd.dlna.mpeg-tts may be used as a MIME Type. When MP4 is used as a system format, AVC_HD_30, AVC_SD_30, AVC_SP_30 and/or AVC_3D_30 may be used as a video format, HEAAC, HEAAC2, HEAAC_MPS, MPEG1_L2, MPEG1 L2_MPS, AC3, E-AC3 and/or DTS may be used as an audio format, and video/mp4 may be used as a MIME Type.

According to one embodiment of the present invention, a video format used in HbbTV may be further defined for an HEVC based broadcast service. HEVC_SD_25, HEVC_SD_30, etc. may be further defined in case of SD resolution, HEVC_HD_25, HEVC_HD_30, HEVC_HD_50, HEVC_HD_60, etc. may be further defined in case of HD resolution, and HEVC_UHD_25, HEVC_UHD_30, HEVC_UHD_50, HEVC_UHD_60, etc. may be further defined in UHD resolution. In addition, according to one embodiment of the present invention, in order to provide a high-quality service, a higher frame rate format may be defined and used not only in HEVC but also in AVC. For example, AVC_HD_50, AVC_HD_60, etc. may be further defined.

FIG. 15 is a diagram showing a video format for providing an HEVC service according to one embodiment of the present invention in xml format.

According to one embodiment of the present invention, a video format of HEVC, UHD and a higher frame rate may be further defined in order to provide an HEVC based broadcast service.

In order to provide an HEVC based broadcast service according to one embodiment of the present invention, HEVC_UHD_25 may be defined as a video format and this format may indicate video encoded using an H.265/HEVC codec and having UHD resolution and a frame rate of 25 Hz. HEVC_UHD_30 may be defined as a video format and this format may indicate video encoded using an H.265/HEVC codec and having UHD resolution and a frame rate of 30 Hz. HEVC_UHD_50 may be defined as a video format and this format may indicate video encoded using an H.265/HEVC codec and having UHD resolution and a frame rate of 50 Hz. HEVC_UHD_60 may be defined as a video format and this format may indicate video encoded using an H.265/HEVC codec and having UHD resolution and a frame rate of 60 Hz. HEVC_HD_25 may be defined as a video format and this format may indicate video encoded using an H.265/HEVC codec and having HD resolution and a frame rate of 25 Hz. HEVC_HD_30 may be defined as a video format and this format may indicate video encoded using an H.265/HEVC codec and having HD resolution and a frame rate of 30 Hz. HEVC_SD_30 may be defined as a video format and this format may indicate video encoded using an H.265/HEVC codec and having SD resolution and a frame rate of 30 Hz. AVC_HD_30 may be defined as a video format and this format may indicate video encoded using an H.264/AVC codec and having HD resolution and a frame rate of 30 Hz. AVC_SD_30 may be defined as a video format and this format may indicate video encoded using an H.264/AVC codec and having SD resolution and a frame rate of 30 Hz.

According to one embodiment of the present invention, the above-described video format information may correspond to information indicating the characteristics of the video stream, may be included in the descriptor of the EIT, and may be transmitted in xml and/or table format.

FIG. 16 is a diagram showing a video format using a termID according to one embodiment of the present invention.

According to one embodiment of the present invention, termID 1 may indicate MPEG-1 video, termID 2 may indicate MPEG-2 video, termID 2.1 may indicate an MPEG-2 video simple profile, termID 2.2 may indicate an MPEG-2 video main profile, termID 2.1.1 may indicate an MPEG-2 video simple profile and a main level, termID 2.2.1 may indicate an MPEG-2 video main profile and a low level, termID 2.2.2 may indicate an MPEG-2 video main profile and a main level, termID 2.2.3 may indicate an MPEG-2 video main profile and a high 1440 level, and termID 2.2.4 may indicate an MPEG-2 video main profile and a high level. That is, termID may indicate the type of the codec, the type of the profile and the type of the level.

FIG. 17 is a diagram showing a video format using a termID in order to provide an HEVC based broadcast service according to one embodiment of the present invention.

According to one embodiment of the present invention, in case of HEVC, termID is set to 9, a main profile is set to 9.1, a main 10 profile is set to 9.2 and a still picture profile is set to 9.3 and then is signaled. Even when the profile is further extended, the profile to be extended may be set to 9.4, 9.5, etc. like the above-described method. A tier and a level may be defined for each profile. A tier according to one embodiment of the present invention may be referred to as tier information and a main tier may be defined as 1 and a higher tier may be defined as 2. A level according to one embodiment of the present invention may indicate 3.0, 3.1, 3.2 to 6.0, 6.1, 6.2 and each level may be defined as one of 1 to 18. For example, termID 9.1.1.1 may indicate HEVC video coding format, main profile, main tier and level 3.0 and termID 9.3.1.18 may indicate HEVC video coding format, still picture profile, main tier and level 6.2.

The tier according to one embodiment of the present invention may be used to decide the limit of the bit rate along with the level. The higher tier and the main tier according to one embodiment of the present invention may be different at a maximum bit rate. For example, at level 5.1 capable of decoding video having resolution of 4K and/or a frame rate of 60p, the maximum bit rate of the main tier may be up to 40000 (1000 bits/s) and the maximum bit rate of the higher tier may be 160000 (1000 bits/s). Accordingly, the stream having the main tier according to one embodiment of the present invention may be mostly used as a stream for broadcast and the stream having the higher tier may be mostly used as a stream for storage at a broadcast station.

According to one embodiment of the present invention, the above-described video format information may correspond to information indicating the characteristics of the video stream, may be included in the descriptor of the EIT, and may be transmitted in xml and/or table format.

FIG. 18 is a diagram showing a video profile for providing an HEVC service according to one embodiment of the present invention.

According to one embodiment of the present invention, one video profile may be defined in order of system format_video format_audio format based on the above-described video format. For example, the video profile may be represented by TS_AVC_HD_25_HEAAC, TS_HEVC_HD_60_HEAAC, etc. More specifically, the format of the video profile may be represented by system format(transmission format format)_videoformat(codec_resolution_framerate)_audioformat(audiocodec).

According to one embodiment of the present invention, MP4_HEVC_SD_30_HEAAC may be defined as a video profile and this video profile may have MP4 as a system format, HEVC as a video codec, SD as resolution, 30 fps as a frame rate, HEAAC as an audio codec, video/mp4 as a MIME type and DASH as a transmission method. MP4_HEVC_HD_30_HEAAC may be defined as a video profile and this video profile may have may have MP4 as a system format, HEVC as a video codec, HD as resolution, 30 fps as a frame rate, HEAAC as an audio codec, video/mp4 as a MIME type and DASH as a transmission method. MP4_HEVC_HD_50_HEAAC may be defined as a video profile and this video profile may have may have MP4 as a system format, HEVC as a video codec, HD as resolution, 50 fps as a frame rate, HEAAC as an audio codec, video/mp4 as a MIME type and DASH as a transmission method. MP4_HEVC_HD_60_HEAAC may be defined as a video profile and this video profile may have may have MP4 as a system format, HEVC as a video codec, HD as resolution, 60 fps as a frame rate, HEAAC as an audio codec, video/mp4 as a MIME type and DASH as a transmission method. MP4_HEVC_UHD_25_HEAAC may be defined as a video profile and this video profile may have may have MP4 as a system format, HEVC as a video codec, UHD as resolution, 25 fps as a frame rate, HEAAC as an audio codec, video/mp4 as a MIME type and DASH as a transmission method. MP4_HEVC_UHD_30_HEAAC may be defined as a video profile and this video profile may have may have MP4 as a system format, HEVC as a video codec, UHD as resolution, 30 fps as a frame rate, HEAAC as an audio codec, video/mp4 as a MIME type and DASH as a transmission method. MP4_HEVC_UHD_50 HEAAC may be defined as a video profile and this video profile may have may have MP4 as a system format, HEVC as a video codec, UHD as resolution, 50 fps as a frame rate, HEAAC as an audio codec, video/mp4 as a MIME type and DASH as a transmission method. MP4_HEVC_UHD_60_HEAAC may be defined as a video profile and this video profile may have may have MP4 as a system format, HEVC as a video codec, UHD as resolution, 60 fps as a frame rate, HEAAC as an audio codec, video/mp4 as a MIME type and DASH as a transmission method. TS_HEVC_SD_30_HEAAC may be defined as a video profile and this video profile may have may have TS as a system format, HEVC as a video codec, SD as resolution, 30 fps as a frame rate, HEAAC as an audio codec, and video/mpeg as a MIME type. TS_HEVC_HD_30_HEAAC may be defined as a video profile and this video profile may have may have TS as a system format, HEVC as a video codec, HD as resolution, 30 fps as a frame rate, HEAAC as an audio codec, and video/mpeg as a MIME type. TS_HEVC_HD_50_HEAAC may be defined as a video profile and this video profile may have may have TS as a system format, HEVC as a video codec, HD as resolution, 50 fps as a frame rate, HEAAC as an audio codec, and video/mpeg as a MIME type. TS_HEVC_HD_60_HEAAC may be defined as a video profile and this video profile may have may have TS as a system format, HEVC as a video codec, HD as resolution, 60 fps as a frame rate, HEAAC as an audio codec, and video/mpeg as a MIME type. TS_HEVC_UHD_25_HEAAC may be defined as a video profile and this video profile may have may have TS as a system format, HEVC as a video codec, UHD as resolution, 25 fps as a frame rate, HEAAC as an audio codec, and video/mpeg as a MIME type. TS_HEVC_UHD_30_HEAAC may be defined as a video profile and this video profile may have may have TS as a system format, HEVC as a video codec, UHD as resolution, 30 fps as a frame rate, HEAAC as an audio codec, and video/mpeg as a MIME type. TS_HEVC_UHD_50_HEAAC may be defined as a video profile and this video profile may have may have TS as a system format, HEVC as a video codec, UHD as resolution, 50 fps as a frame rate, HEAAC as an audio codec, and video/mpeg as a MIME type. TS_HEVC_UHD_60_HEAAC may be defined as a video profile and this video profile may have may have TS as a system format, HEVC as a video codec, UHD as resolution, 60 fps as a frame rate, HEAAC as an audio codec, and video/mpeg as a MIME type.

According to one embodiment of the present invention, the above-described video profile information may correspond to information indicating the characteristics of a video stream, may be included in the descriptor of the EIT and may be transmitted in xml and/or table format.

FIG. 19 is a diagram showing a video attribute type according to one embodiment of the present invention.

In HbbTV according to one embodiment of the present invention, in order to deliver information related to video, a video attribute type may be delivered in xml format.

As shown in this figure, a VideoAttributesType according to one embodiment of the present invention includes a Coding element, a Scan element, a HorizontalSize element, a VerticalSize element, an AspectRatio element, a Color element, a FrameRate element, a BitRate element and/or a PictureFormat element. The above-described elements will be described in detail below with reference to the subsequent figures.

According to one embodiment of the present invention, the element information of the above-described video attribute type may correspond to information indicating the characteristics of a video stream, may be included in the descriptor of the EIT and may be transmitted in xml and/or table format.

FIG. 20 is a diagram showing a description of a video attribute according to one embodiment of the present invention.

The VideoAttributesType according to one embodiment of the present invention includes a Coding element, a Scan element, a HorizontalSize element, a VerticalSize element, an AspectRatio element, a Color element, a FrameRate element, BitRate element and/or a PictureFormat element. In addition, the Scan element may be connected to a ScanType, the AspectRatio element may be connected to AspectRatioType and type elements, and the Color element may be connected to ColorTypeType, ColorType and/or type elements.

The VideoAttributesType may indicate a set of elements describing video characteristics. (A complex type defining a set of elements that describe video characteristics).

The Coding element may indicate the coding format of video (The coding format of the video. This term should be taken from the MPEG-7 "VisualCodingFormatCS" classification scheme listed in clause B.2.34 of ISO/IEC 15938-5 [2]). This element may be signaled in a codec_profile_level format. In case of HEVC according to one embodiment of the present invention, tier information may be used to classify profiles. The tier information may indicate main or high. Main may indicate video for a broadcast service and high may indicate video for studio storage. Even at the same profile/level, the defined maximum bit rate may be changed according to the tier information. In one embodiment of the present invention, the type of the tier may be added to this element and the type of the tier may be added to the video attribute type and are signaled. If the tier information is included in the Coding element, in one embodiment of the present invention, a video stream may be signaled in a codec_profile_tier_level format. For example, in case of providing video 4K UHD 60p of 10 bits coded for a broadcast service based on HEVC, the video may be signaled as HEVC Video Main10 profile Main tier @ Level 5.1. That is, the tier information may be added to extend signaling, like HEVC Video Main Profile Main tier @ Level {3.0~6.2}, HEVC Video Main 10 Profile Main tier @ Level {3.0~6.2}, etc.

The Scan element may indicate the scan type of video (The scan type of the video).

The HorizontalSize element may indicate the horizontal size in pixels of video (The horizontal size in pixels of the video). This element according to one embodiment of the present invention may include 2160 for a 4K UHD service and 4320 for an 8K UHD service.

The VerticalSize element may indicate the vertical size in pixels of video (The vertical size in pixels of the video). This element according to one embodiment of the present invention may include 3840 for a 4K UHD service and 7680 for an 8K UHD service.

The AspectRatio element may indicate the aspect of video (The aspect ratio of the video. There may be two aspect ratios associated with a programme: the original aspect ratio that the programme is available in and the aspect ratio of a particular instance of the programme). The aspect ratio according to one embodiment of the present invention may be classified into two aspect ratios. A first aspect ratio is an original aspect ratio available in a program and a second aspect ratio is an aspect ratio for a specific instance of a program. The AspectRatio may be represented by RatioType (H:V) and may be connected to an AspectRatioType and/or an AspectRatioTypeType. The values which may be provided by the AspectRatioTypeType may be publication and original values. The AspectRatioTypeType according to one embodiment of the present invention may include AFD bar related information. The AFD bar will be described in detail below with reference to the subsequent figures.

The Color element may indicate the color format of video (The colour format of the video (e.g. black and white)). According to one embodiment of the present invention, this element may be connected to a ColorTypeType and a ColorType and may be classified into color, blackAndWhite, blackAndWhiteAndColor and colorized.

The FrameRate element may indicate the frame rate of video (An element expressing the frame rate of the video). According one embodiment of the present invention, this element may include higher frame rates such as 30, 50 and 60 fps and support not only an integer frame rate but also a fractional frame rate.

The BitRate element may indicate the bit rate of a video stream (An element to define the bit rate of the video stream). According to one embodiment of the present invention, this element may indicate the bit rate of all streams including a video stream. Here, this element may be classified into min, max and average and then signaled. For example, the maximum bit rate of all streams including SD resolution may be 4000 kbits/s, the maximum bit rate of all streams including HD resolution may be 10000 kbits/s and the maximum bit rate of all streams for the HEVC based UHD service may be 30000 kbits/s. The above-described maximum bit rate may be changed according to the type of the service. The bit rate will be described in detail below with reference to the figure related thereto.

The PictureFormat element may indicate the format of a video image (An element to define the format of the video image from a predefined list (PictureFormatCS Classification Scheme). When this element is not provided in an XML instance document, the video format can be assumed to be "2D Video"). According to one embodiment of the present invention, this element may indicate 2D video, Piano-Stereoscopic Video, Frame-Compatible 3D, Side-by-Side 3D Format, Top-and-Bottom 3D Format, etc.

The ScanType may indicate interlaced or progressive (A simple enumerated type defining the allowable values of the ScanType element above. ScanType can take on the value interlaced or progressive).

The AspectRatioType may indicate the aspect ratio of the program (Denotes the aspect ratio of the programme. This element can denote the aspect ratio of the original programme as well as that of its instances, through the use of type attribute). The AspectRatioType may have a type element, and the type element may indicate original or publication. (Denotes whether the specified aspect ratio is associated with the original programme (original) or its published instance (publication). The default value of the attribute is original).

The ColorTypeType may indicate the value corresponding to the above-described Color element (A simple enumerated type defining the allowable values of the ColorType instantiated in the Color element above. Allowed values are: color—the content was produced using a colour video format; blackAndWhite—the content was produced using a black and white video format; blackAndWhiteAndColor—the content contains a mixture of video that was originally produced in colour and content that was produced in black and white; colorized—the content was originally produced using a black and white video format and colour was added after original production).

The ColorType may indicate the complex type of the color format (A complex type, with a single attribute describing the colour format using one of the ColorTypeType values). The ColorType may have a type element and the type element may indicate the type of the color format.

According to one embodiment of the present invention, the element information included in the above-described video attribute type may correspond to information indicating the characteristics of a video stream, may be included in the descriptor of the EIT and may be transmitted in xml and/or table format.

FIG. 21 is a diagram showing a video attribute according to one embodiment of the present invention in xml format.

As shown in this figure, the elements included in the VideoAttributesType may be defined via xml.

The ScanType according to one embodiment of the present invention may represent interlaced and/or progressive, the ColorTypeType may have color, blackAndWhite, blackAndWhiteAndColor and/or colorized values and the AspectRatioType may have original and/or publication values.

Among the attributes or elements shown in this figure, the attributes or elements having the same names as the attributes or elements described in the above figure may have the same meanings.

FIG. 22 is a diagram showing an AspectRatiOrgType and an AspectRatioDisplayType according to one embodiment of the present invention.

One embodiment of the present invention may define AspectRatioOrgType and AspectRatioDisplayType in order to indicate AFDbar related information. The AFD according to one embodiment of the present invention is an abbreviation for active format description and may enable different types of broadcast images to be displayed on television sets having different aspect ratios. The AFDbar may indicate a tool used for the AFD function. The AspectRatioOrgType according to one embodiment of the present invention may indicate an aspect ratio upon filming and the AspectRatioDisplay type may indicate a finally displayed aspect ratio. One embodiment of the present invention may signal a PostProcessingFlag in order to insert the AFDbar or determine scaling and/or crop. The above-described PostProcessingFlag may indicate 1 if post processing such as AFDbar insertion, scaling, crop, etc. is necessary on the video screen and indicate 0 if post processing is not necessary.

As shown in this figure, the aspect ratio is 4:3 when the AspectRatioOrgType and/or the AspectRatioDisplayType is 00, is 16:9 when the AspectRatioOrgType and/or the AspectRatioDisplayType is 01 and 21:9 when the AspectRatioOrgType and/or the AspectRatioDisplayType is 10. The aspect ratio according to one embodiment of the present invention may be referred to as a picture ratio.

According to one embodiment of the present invention, the information related to AspectRatioOrgType and the AspectRatioDisplayType may correspond to information indicating the characteristics of a video stream, may be included in the descriptor of the EIT and may be transmitted in xml and/or table format.

FIG. 23 is a diagram showing an AFDBarType according to one embodiment of the present invention.

In one embodiment of the present invention, the AspectRatioOrgType and the AspectRatioDisplayType described with reference to the previous figure are compared and, when the aspect ratios are different, insertion of the AFDbar may be determined. Here, insertion of the AFDbar may be determined using the PostProcessingFlag and/or the AFDBarType. When the PostProcessingFlag is 1, one embodiment of the present invention may signal in which format the AFDbar is inserted or whether scaling or crop is performed using the AFDBarType.

As shown in this figure, when the AFDBarType according to one embodiment of the present invention is 00, according to one embodiment of the present invention, an image may be asymmetrically scaled according to the size of the display and, when the AFDBarType is 01, an image may be symmetrically scaled according to the aspect ratio and the remaining part may be cropped. When the AFDBarType is 10, that is, when the AspectRatioOrgType is greater than the AspectRatioDisplayType, one embodiment of the present invention may insert a Letterbox into an image and, when the AFDBarType is 11, that is, when the AspectRatioOrgType is less than the AspectRatioDisplayType, a Pillarbox may be inserted into an image according to one embodiment of the present invention.

According to one embodiment of the present invention, the information related to PostProcessingFlag and/or the AFDBarType may correspond to information indicating the characteristics of a video stream, may be included in the descriptor of the EIT and may be transmitted in xml and/or table format.

FIG. 24 is a diagram showing a BitRateType according to one embodiment of the present invention.

The BitRateType according to one embodiment of the present invention may include a variable element, a minimum element, an average element and/or a maximum element.

The BitRateType may define the bit rate for a content item (A complex type that defines the bit rate for a content item expressed in bits per second. The data value associated with this type defines the average bitrate if the bitrate is variable).

The variable element may indicate whether the bit rate is variable or fixed (Indicates whether the BitRate is variable or fixed. If the Bitrate is variable, three optional attributes can be used to specify the minimum, maximum and average bitrates).

The minimum element may indicate the minimum numerical value for the bit rate (Indicates the minimum numerical value for the BitRate in case of variable bit rate).

The average element may indicate the average numerical value for the bit rate (Indicates the average numerical value for the BitRate in case of variable bit rate).

The maximum element may indicate the maximum numerical value for the bit rate (Indicates the maximum numerical value for the BitRate in case of variable bit rate).

According to one embodiment of the present invention, the information related to the BitRateType element, the variable element, the minimum element, the average element and/or the maximum element may correspond to information indicating the characteristics of a video stream, may be included in the descriptor of the EIT and may be transmitted in xml and/or table format.

FIG. 25 is a diagram showing video attributes for providing a UHD service according to one embodiment of the present invention.

Bit-depth, HDR, Color primary and Chroma subsampling may be further defined in order to provide the UHD service according to one embodiment of the present invention.

As shown in this figure, the bit-depth may indicate the number of bits used to express black to white. For example, the bit-depth may be 8, 10 or 12 bits. The bit-depth according to one embodiment of the present invention may correspond to information on the number of bits used to represent the color from black to white.

The HDR according to one embodiment of the present invention may correspond to the high dynamic range information according to one embodiment of the present invention. One embodiment of the present invention may divide the above-described high dynamic range into minimum luminance and maximum luminance and signal the minimum luminance and the maximum luminance. The high dynamic range information may be signaled by a min.luminance value indicating the minimum luminance and a max.luminance value indicating the maximum luminance. Another embodiment of the present invention may specify a profile for dividing the high dynamic range. For example, conventional capacity may be specified to have a dynamic range of a minimum luminance of 0.1 $cd/m^2$ and a maximum luminance of 100 $cd/m^2$, mid.capacity may be specified to have a dynamic range of a minimum luminance of 0.001 $cd/m^2$ and a maximum luminance of 1000 $cd/m^2$ and high capacity may be specified to have a dynamic range of a minimum luminance of 0.0001 $cd/m^2$ and a maximum luminance of 10000 $cd/m^2$.

Color primary according to one embodiment of the present invention may correspond to color management information and a color coordinate representing the color may be divided. For example, color primary may indicate standard color spaces such as BT.709, BT.2020, DCI-P3, etc. and indicate custom color spaces. In one embodiment of the present invention, when the color space is custom, x and y coordinate values for RGB and white points may be further signaled. At this time, since a sum of x, y and z coordinate values is 1, the z coordinate value may not be signaled.

Chroma subsampling according to one embodiment of the present invention may indicate the amount of information of the chroma component as compared to the luma component upon encoding. For example, chroma subsampling may have a value of 4:0:0, 4:2:2, 4:4:4, etc.

According to one embodiment of the present invention, the information related to bit-depth, HDR, color primary and/or chroma subsampling may correspond to information indicating the characteristics of a video stream, may be included in the descriptor of the EIT and may be transmitted in xml and/or table format.

Figure 26:
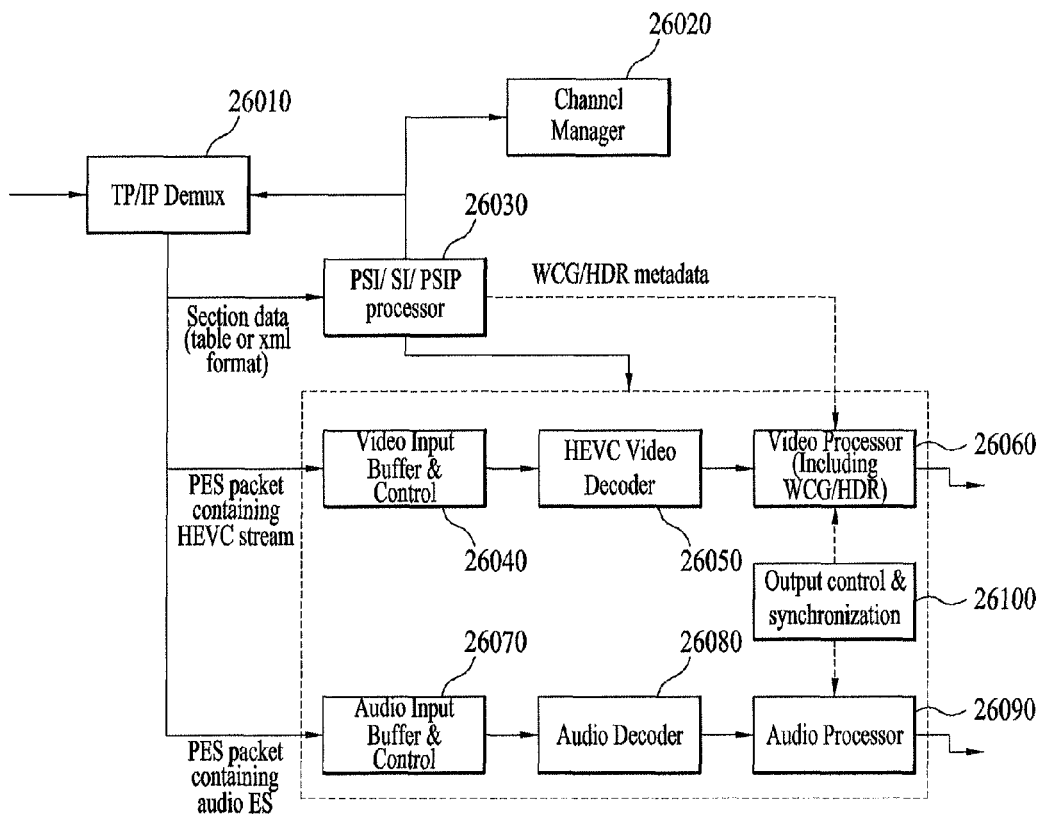
FIG. 26 is a diagram showing the structure of a broadcast reception apparatus according to one embodiment of the present invention.

FIG. 26 is a diagram showing the structure of a broadcast reception apparatus according to one embodiment of the present invention.

The broadcast reception apparatus according to one embodiment of the present invention includes a TP/IP demux 26010, a channel manager 26020, a PSI/SI/PSIP processor 26030, a video input buffer and control unit 26040, an HEVC video decoder 26050, a video processor 26060, an audio input buffer and control unit 26070, an audio decoder 26080, an audio processor 26090 and/or an output control and synchronization unit 26100.

The demux may demultiplex PSI/PSIP/SI section information necessary to confirm channel information and video and audio information and deliver the demultiplexed packets to the PSI/SI/PSIP processor, the video decoder (or the video buffer) and the audio decoder (or the audio buffer). The PSI/PSIP/SI section information may be provided in table or xml format. The demux according to one embodiment of the present invention may include a receiver and the receiver may receive a broadcast stream multiplexed at a transmission side. The demux may extract a video stream and/or signaling information from the multiplexed broadcast stream. Here, the signaling information may include any one of information indicating that the extracted video stream is an HEVC video stream, information indicating the characteristics of the extracted video stream and information indicating that a broadcast service based on the extracted video stream is an HEVC based broadcast service.

The channel manager may confirm which channel can be received using the information parsed from the section data and perform operation necessary to generate a channel related list.

The PSI/SI/PSIP processor may extract information necessary for operation of the demux, the channel manager and the UI. The signaling information according to one embodiment of the present invention may include at least one of a program map table (PMT), an event information table (EIT) and a service description table (SDT). The PMT may include information indicating an HEVC video stream, the EIT may include information indicating the characteristics of the video stream and the SDT may include information indicating an HEVC based broadcast service. Further, the signaling information may include information indicating the high dynamic range of the video stream and include color management information for improved color expression of the video stream. The information indicating the characteristics of the video stream may include codec information, resolution information, frame rate information and/or information on the number of bits used to express the color from black to white and may include tier information for identifying whether the video stream is a stream for broadcast or a stream for storage.

The video processor may perform color space conversion, deinterleaving, and frame rate conversion processes with respect to the image decoded by the video decoder. The video processor may control a display environment to provide an optimal color or convert video such that content is optimally expressed within a target luminance range suitable for the manufacturer's intentions.

The video buffer may store the video stream before delivering the video stream to the video decoder.

The video decoder may decode the extracted video stream using the signaling information extracted by the demux.

The audio buffer may store an audio stream before delivering the audio stream to the audio decoder.

The audio decoder may decode the audio stream demultiplexed by the demux.

The audio processor may perform an additional procedure for playback with respect to the audio decoded by the audio decoder.

The output control and synchronization unit may perform synchronization of video data and audio data.

Figure 27:
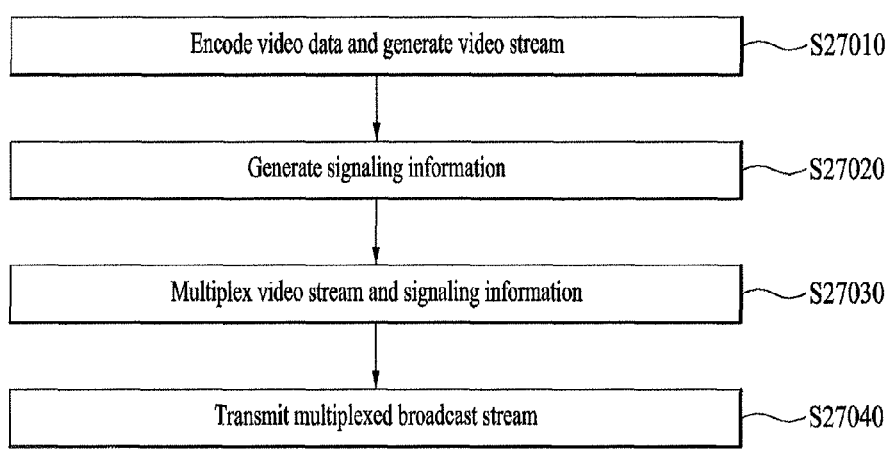
FIG. 27 is a diagram showing a broadcast signal transmission method according to one embodiment of the present invention.

FIG. 27 is a diagram showing a broadcast signal transmission method according to one embodiment of the present invention.

As shown in this figure, the broadcast signal transmission method according to one embodiment of the present invention may perform the following processes. First, a transmission side according to one embodiment of the present invention may encode video data and generate a video stream (S27010). Here, an AVC or HEVC codec may be used. Next, the transmission side may generate signaling information (S27020). Here, the signaling information may include any one of information indicating that the generated video stream is an HEVC video stream, information indicating the characteristics of the generated video stream and information indicating that a broadcast service based on the generated video stream is an HEVC based broadcast service. The information included in the signaling information was described in the description of FIGS. 1, 2, 3, 4, 9 and 11. Next, the transmission side may multiplex the generated video stream and signaling information (S27030). According to one embodiment of the present invention, the video stream, the audio stream, the signaling information, etc. may be multiplexed into one broadcast stream. Here, one broadcast stream may correspond to an MPEG-2 TS. Next, the transmission side may transmit the multiplexed broadcast stream (S27040). Here, the transmission side may transmit the multiplexed broadcast stream via a terrestrial broadcast network, a cable network and/or an Internet protocol network.

According to another embodiment of the present invention, the signaling information may include at least one of a program map table (PMT), an event information table (EIT) and a service description table (SDT). The PMT may include information indicating an HEVC video stream, the EIT may include information indicating the characteristics of the video stream and the SDT may include information indicating an HEVC based broadcast service. The PMT, the EIT and the SDT were described in the description of FIGS. 1, 2 and 9.

According to another embodiment of the present invention, the signaling information may include information indicating the high dynamic range of the video stream. This was described in detail in the description of FIGS. 5 and 6.

According to another embodiment of the present invention, the signaling information may include color management information for improved color expression of the video stream. This was described in detail in the description of FIGS. 7 and 8.

According to another embodiment of the present invention, the information indicating the characteristics of the video stream may include codec information, resolution information, frame rate information and/or information on the number of bits used to express the color from black to white. This was described in detail in the description of FIGS. 12, 13, 14, 15, 16 and 25.

According to another embodiment of the present invention, the information indicating the characteristics of the video stream may include tier information for identifying whether the video stream is a stream for broadcast or a stream for storage. This was described in detail in the description of FIG. 17.

According to another embodiment of the present invention, the signaling information may have a table section format or xml format and the signaling information may be transmitted via a broadcast network and/or an Internet protocol network.

Figure 28:
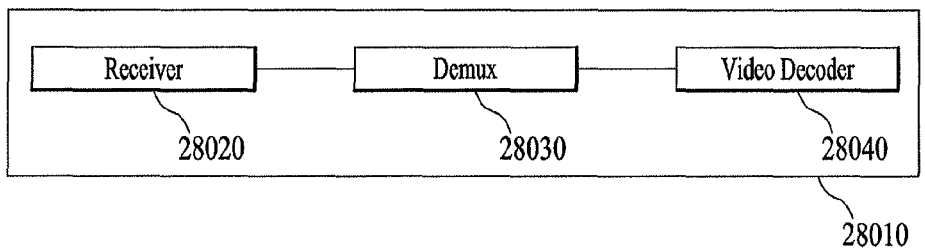
FIG. 28 is a diagram showing the structure of a broadcast signal reception apparatus according to one embodiment of the present invention.

FIG. 28 is a diagram showing the structure of a broadcast signal reception apparatus according to one embodiment of the present invention.

The broadcast signal reception apparatus 28010 according to one embodiment of the present invention may include a receiver 28020, a demux 28030 and/or a video decoder 28040.

The receiver may receive a broadcast stream multiplexed by a transmission side.

The demux may extract a video stream and/or signaling information from the multiplexed broadcast stream. Here, the signaling information may include any one of information indicating that the extracted video stream is an HEVC video stream, information indicating the characteristics of the extracted video stream and information indicating that a broadcast service based on the extracted video stream is an HEVC based broadcast service.

The video decoder may decode the extracted video stream using the extracted signaling information.

The structure of the broadcast signal reception apparatus according to one embodiment of the present invention was described in the description of FIG. 26.

Figure 29:
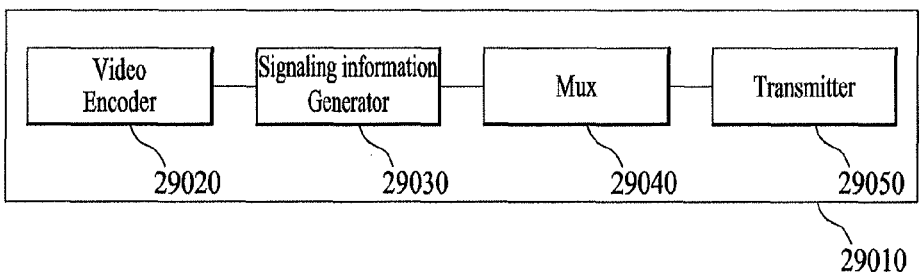
FIG. 29 is a diagram showing the structure of a broadcast signal transmission apparatus according to one embodiment of the present invention.

FIG. 29 is a diagram showing the structure of a broadcast signal transmission apparatus according to one embodiment of the present invention.

The broadcast signal transmission apparatus 29010 according to one embodiment of the present invention may include a video encoder 29020, a signaling information generator 29030, a mux 29040 and/or a transmitter 29050.

The video encoder may encode video data and generate a video stream.

The signaling information generator may generate signaling information including information indicating that the video stream is an HEVC video stream, information indicating the characteristics of the video stream and information indicating that a broadcast service based on the video stream is an HEVC based broadcast service.

The mux may multiplex the video stream and the signaling information.

The transmitter may transmit the multiplexed broadcast stream.

The configuration of the broadcast signal transmission apparatus according to one embodiment of the present invention corresponding to the broadcast signal transmission method according to one embodiment of the present invention described with reference to FIG. 27 may perform the same role as the processes of the above-described broadcast signal transmission method.

Figure 30:
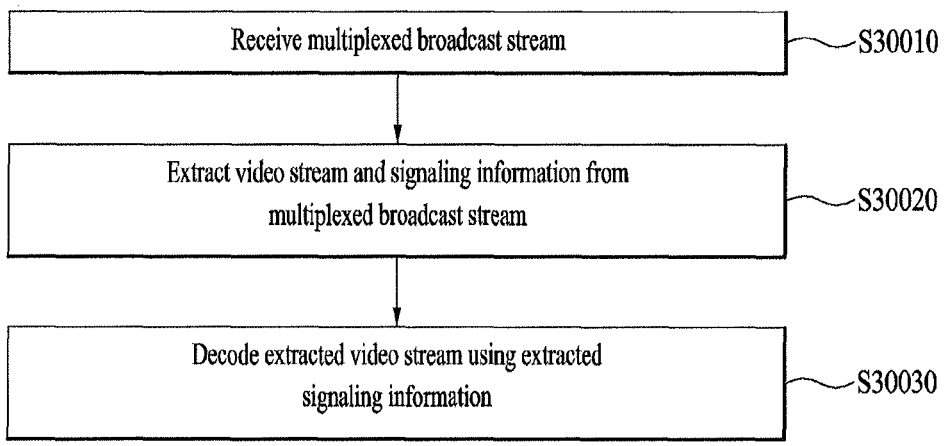
FIG. 30 is a diagram showing a broadcast signal reception method according to one embodiment of the present invention.

FIG. 30 is a diagram showing a broadcast signal reception method according to one embodiment of the present invention.

The broadcast signal reception method according to one embodiment of the present invention may include step S30010 of receiving the multiplexed broadcast stream, step S30020 of extracting the video stream and the signaling information from the multiplexed broadcast stream and/or step S30030 of decoding the extracted video stream using the extracted signaling information.

In step S30010 of receiving the multiplexed broadcast stream, the reception apparatus may receive the multiplexed broadcast stream.

In step S30020 of extracting the video stream and the signaling information from the multiplexed broadcast stream, the reception apparatus may extract the video stream and/or the signaling information from the multiplexed broadcast stream. Here, the signaling information may include any one of information indicating that the extracted video stream is an HEVC video stream, information indicating the characteristics of the extracted video stream and information indicating that a broadcast service based on the extracted video stream is an HEVC based broadcast service.

In step S30030 of decoding the extracted video stream using the extracted signaling information, the reception apparatus may decode the extracted video stream using the extracted signaling information.

The processes of the broadcast signal transmission method according to one embodiment of the present invention corresponding to the configuration of the broadcast signal transmission apparatus according to one embodiment of the present invention described with reference to FIG. 26 and/or FIG. 28 may perform the same role as the corresponding configuration of the above-described broadcast signal transmission apparatus.

While the embodiments have been described with reference to respective drawings for convenience, embodiments may be combined to implement a new embodiment. In addition, designing a computer-readable recording medium storing programs for implementing the aforementioned embodiments is within the scope of the present invention.

The apparatus and method according to the present invention are not limited to the configurations and methods of the above-described embodiments and all or some of the embodiments may be selectively combined to obtain various modifications.

The image processing methods proposed by the present invention may be implemented as processor-readable code stored in a processor-readable recording medium included in a network device. The processor-readable recording medium includes all kinds of recording media storing data readable by a processor. Examples of the processor-readable recording medium include a ROM, a RAM, a CD-ROM, a magnetic tape, a floppy disk, an optical data storage device and the like, and implementation as carrier waves such as transmission over the Internet. In addition, the processor-readable recording medium may be distributed to computer systems connected through a network, stored and executed as code readable in a distributed manner.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. Such modifications should not be individually understood from the technical spirit or prospect of the present invention.

Both apparatus and method inventions are mentioned in this specification and descriptions of both the apparatus and method inventions may be complementarily applied to each other.

MODE FOR INVENTION

Various embodiments have been described in the best mode for carrying out the invention.

INDUSTRIAL APPLICABILITY

The present invention is applied to broadcast fields.

The invention claimed is:
1. A broadcast signal transmission method comprising:
encoding video data and generating a video stream;
generating a program map table (PMT),
  wherein the PMT includes stream type information indicating that the video stream corresponds to a high efficiency video coding (HEVC) video stream;
generating a service description table (SDT) and an event information table (EIT),
  wherein the SDT includes service type information indicating that a broadcast service providing the video data corresponds to a HEVC based broadcast service,
  wherein the EIT describes information for a broadcast event provided in the broadcast service,
  wherein the EIT includes stream content information and component type information,
  wherein the stream content information identifies the video stream included in the broadcast event,
  wherein the component type information identifies characteristics of a video component provided by the video stream, and
  wherein a combination of the stream content information and the component type information indicates that the video stream corresponds to the HEVC video stream and a resolution of the video component provided by the video stream corresponds to an ultra high definition (UHD) resolution;
generating video profile information of the video component provided by the video stream,
  wherein the video profile information indicates that a system format transmitting the video component corresponds to a moving picture experts group (MPEG)-4 format, the video stream corresponds to the HEVC video stream, a resolution of the video component corresponds to the UHD resolution, a frame rate of the video component corresponds to 25 frames per second and an audio stream matched with the video stream corresponds to a high efficiency advanced audio coding (HEAAC) audio stream;
multiplexing the generated video stream and signaling information,
  wherein the signaling information includes the PMT, the SDT, the EIT and the video profile information; and
transmitting the multiplexed broadcast stream.
2. The broadcast signal transmission method according to claim 1, wherein the EIT includes maximum and minimum luminance information for the video component provided by the video stream, upper and lower limit luminance information of an essential dynamic range which is essentially required to be expressed in an entire dynamic range of the video component and information about an extended dynamic range when the essential dynamic range is extended.

3. The broadcast signal transmission method according to claim 1, wherein the EIT includes flag information indicating whether a predefined color gamut or an arbitrary color gamut is used in the video component, information of coordinate values of red, green and blue colors within a color coordinate system by the arbitrary color gamut and recommendation information indicating maximum and minimum values of a display recommended for displaying the video component.

4. The broadcast signal transmission method according to claim 1, further comprising:
  generating video format information indicating a format of the video stream,
  wherein the video format information includes codec information of the video stream, profile information of the video stream, level information of the video stream and tier information of the video stream, and
  wherein a combination of the level information and the tier information identifies a bit rate of the video stream.

5. The broadcast signal transmission method according to claim 1, wherein the signaling information has a table section format or extensible markup language (XML) format.

6. A broadcast signal reception apparatus comprising:
  a receiver configured to receive a multiplexed broadcast stream;
  a demultiplexer configured to extract a video stream and signaling information from the multiplexed broadcast stream,
  wherein the signaling information includes a program map table (PMT), a service description table (SDT), an event information table (EIT) and video profile information of a video component provided by the video stream,
  wherein the PMT includes stream type information indicating that the video stream corresponds to a high efficiency video coding (HEVC) video stream,
  wherein the SDT includes service type information indicating that a broadcast service providing the video data corresponds to a HEVC based broadcast service,
  wherein the EIT describes information for a broadcast event provided in the broadcast service,
  wherein the EIT includes stream content information and component type information,
  wherein the stream content information identifies the video stream included in the broadcast event,
  wherein the component type information identifies characteristics of a video component provided by the video stream,
  wherein a combination of the stream content information and the component type information indicates that the video stream corresponds to the HEVC video stream and a resolution of the video component provided by the video stream corresponds to an ultra high definition (UHD) resolution, and
  wherein the video profile information indicates that a system format transmitting the video component corresponds to a moving picture experts group (MPEG)-4format, the video stream corresponds to the HEVC video stream, a resolution of the video component corresponds to the UHD resolution, a frame rate of the video component corresponds to 25 frames per second and an audio stream matched with the video stream corresponds to a high efficiency advanced audio coding (HEAAC) audio stream; and
  a video decoder configured to decode the extracted video stream using the extracted signaling information.

7. The broadcast signal reception apparatus according to claim 6, wherein the EIT includes maximum and minimum luminance information for the video component provided by the video stream, upper and lower limit luminance information of an essential dynamic range which is essentially required to be expressed in an entire dynamic range of the video component and information about an extended dynamic range when the essential dynamic range is extended.

8. The broadcast signal reception apparatus according to claim 6, wherein the EIT includes flag information indicating whether a predefined color gamut or an arbitrary color gamut is used in the video component, information of coordinate values of red, green and blue colors within a color coordinate system by the arbitrary color gamut and recommendation information indicating maximum and minimum values of a display recommended for displaying the video component.

9. The broadcast signal reception apparatus according to claim 6,
  wherein the signaling information further includes video format information indicating a format of the video stream,
  wherein the video format information includes codec information of the video stream, profile information of the video stream, level information of the video stream and tier information of the video stream, and
  wherein a combination of the level information and the tier information identifies a bit rate of the video stream.

10. The broadcast signal reception apparatus according to claim 6, wherein the signaling information has a table section format or extensible markup language (XML) format.

11. A broadcast signal transmission apparatus comprising:
  an encoder configured to encode video data and generate a video stream,
  a signaling information generator configured to generate a program map table (PMT), wherein the PMT includes stream type information indicating that the video stream corresponds to a high efficiency video coding (HEVC) video stream,
  wherein the signaling information generator further generates a service description table (SDT) and an event information table (EIT),
  wherein the SDT includes service type information indicating that a broadcast service providing the video data corresponds to a HEVC based broadcast service,
  wherein the EIT describes information for a broadcast event provided in the broadcast service,
  wherein the EIT includes stream content information and component type information,
  wherein the stream content information identifies the video stream included in the broadcast event,
  wherein the component type information identifies characteristics of a video component provided by the video stream,
  wherein a combination of the stream content information and the component type information indicates that the video stream corresponds to the HEVC video stream and a resolution of the video component provided by the video stream corresponds to an ultra high definition (UHD) resolution, wherein the signaling information generator further generates video profile information of the video component provided by the video stream, and wherein the video profile information indicates that a system format transmitting the video component corresponds to a moving picture experts group (MPEG)-4format, the video stream corresponds to the HEVC video stream, a resolution of the video component corresponds to the UHD resolution, a frame rate of the video component corresponds to 25 frames per second and an audio stream matched with the video stream corresponds to a high efficiency advanced audio coding (HEAAC) audio stream;

a multiplexer configured to multiplex the generated video stream and signaling information, wherein the signaling information includes the PMT, the SDT, the EIT and the video profile information; and a transmitter configured to transmit the multiplexed broadcast stream.

12. A broadcast signal reception method comprising:

receiving a multiplexed broadcast stream;

extracting a video stream and signaling information from the multiplexed broadcast stream, wherein the signaling information includes a program map table (PMT), a service description table (SDT), an event information table (EIT) and video profile information of a video component provided by the video stream, wherein the PMT includes stream type information indicating that the video stream corresponds to a high efficiency video coding (HEVC) video stream, wherein the SDT includes service type information indicating that a broadcast service providing the video data corresponds to a HEVC based broadcast service, wherein the EIT describes information for a broadcast event provided in the broadcast service, wherein the EIT includes stream content information and component type information, wherein the stream content information identifies the video stream included in the broadcast event, wherein the component type information identifies characteristics of a video component provided by the video stream, wherein a combination of the stream content information and the component type information indicates that the video stream corresponds to the HEVC video stream and a resolution of the video component provided by the video stream corresponds to an ultra high definition (UHD) resolution, and wherein the video profile information indicates that a system format transmitting the video component corresponds to a moving picture experts group (MPEG)-4format, the video stream corresponds to the HEVC video stream, a resolution of the video component corresponds to the UHD resolution, a frame rate of the video component corresponds to 25 frames per second and an audio stream matched with the video stream corresponds to a high efficiency advanced audio coding (HEAAC) audio stream; and decoding the extracted video stream using the extracted signaling information.

* * * * *